(12) United States Patent
Meier et al.

(10) Patent No.: US 11,960,041 B2
(45) Date of Patent: *Apr. 16, 2024

(54) METHODS, SYSTEMS, AND MEDIA FOR MANAGING WIND SPEED DATA, SEISMIC DATA AND OTHER PARAMETRIC DATA

(71) Applicant: New Paradigm Group, LLC, Fort Lauderdale, FL (US)

(72) Inventors: Bradley I. Meier, Golden Beach, FL (US); Evan M. Glassman, Fort Lauderdale, FL (US)

(73) Assignee: NEW PARADIGM GROUP, LLC, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,659

(22) Filed: Jun. 23, 2023

(65) Prior Publication Data
US 2023/0333271 A1    Oct. 19, 2023

Related U.S. Application Data

(63) Continuation of application No. 17/959,085, filed on Oct. 3, 2022, now Pat. No. 11,703,606, which is a
(Continued)

(51) Int. Cl.
*G01V 1/22*    (2006.01)
*G01V 1/00*    (2006.01)
(Continued)

(52) U.S. Cl.
CPC .............. *G01V 1/223* (2013.01); *G01V 1/008* (2013.01); *G01V 1/162* (2013.01); *G01W 1/02* (2013.01);
(Continued)

(58) Field of Classification Search
CPC ........ G01V 1/223; G01V 1/008; G01V 1/162; H04W 76/10; G01W 1/02; G06Q 20/85
See application file for complete search history.

(56) References Cited

U.S. PATENT DOCUMENTS

| 4,730,485 A | 3/1988 | Franklin et al. |
| 6,952,648 B1 | 10/2005 | Menard et al. |

(Continued)

FOREIGN PATENT DOCUMENTS

| CN | 202058299 U | 11/2011 |
| CN | 102571442 A | 7/2012 |

(Continued)

OTHER PUBLICATIONS

China National Intellectual Property Administration: Notification to Grant Patent Right for Invention of CN Application No. 2020111100545 (related application); dated Mar. 30, 2023; 4 pages.
(Continued)

*Primary Examiner* — Suraj M Joshi

(57) ABSTRACT

A system for collecting and managing parametric data via an external communications network comprises one or more parametric stations operatively connected via the external network to a certification server and a payout server. Each parametric station is configured to receive parametric data from a remote source, determine that the parametric data satisfies a predetermined condition, and transmit the parametric data over the external network to the certification server in response to the parametric data satisfying the predetermined condition. The certification server is configured to generate a certification report based on the parametric data and a data model related to the remote source and transmit the generated certification report to the payout server. The payout server is configured to determine that terms of an associated contract are satisfied based on the
(Continued)

certification report, and trigger a payout based on the terms that are satisfied based on the certification report.

20 Claims, 10 Drawing Sheets

Related U.S. Application Data continuation of application No. 17/468,133, filed on Sep. 7, 2021, now Pat. No. 11,460,592, which is a continuation of application No. 16/533,556, filed on Aug. 6, 2019, now Pat. No. 11,112,512, which is a continuation-in-part of application No. 15/285,762, filed on Oct. 5, 2016, now Pat. No. 10,375,182.

(60) Provisional application No. 62/239,072, filed on Oct. 8, 2015.

(51) Int. Cl.
| | |
|---|---|
| *G01V 1/16* | (2006.01) |
| *G01W 1/02* | (2006.01) |
| *G06Q 20/08* | (2012.01) |
| *H04W 76/10* | (2018.01) |
| *G01P 1/07* | (2006.01) |
| *G01P 5/00* | (2006.01) |
| *H04W 4/80* | (2018.01) |
| *H04W 84/12* | (2009.01) |

(52) U.S. Cl.
CPC .......... *G06Q 20/085* (2013.01); *H04W 76/10* (2018.02); *G01P 1/07* (2013.01); *G01P 5/00* (2013.01); *H04W 4/80* (2018.02); *H04W 84/12* (2013.01)

(56) References Cited

U.S. PATENT DOCUMENTS

| | | | |
|---|---|---|---|
| 7,114,388 B1 | 10/2006 | French et al. | |
| 7,774,139 B1 | 8/2010 | Rose et al. | |
| 8,452,620 B1 | 5/2013 | Grundfest | |
| 9,947,202 B1 | 4/2018 | Moon et al. | |
| 2002/0029111 A1 | 3/2002 | Peek et al. | |
| 2005/0108150 A1 | 5/2005 | Pethick et al. | |
| 2006/0173623 A1 | 8/2006 | Grzych et al. | |
| 2006/0201256 A1* | 9/2006 | Hayman | G01V 1/181 73/754 |
| 2006/0223494 A1 | 10/2006 | Chmaytelli et al. | |
| 2007/0033153 A1* | 2/2007 | Yamanaka | G01V 1/008 706/21 |
| 2007/0271119 A1 | 11/2007 | Boerger et al. | |
| 2009/0024543 A1 | 1/2009 | Horowitz et al. | |
| 2009/0225629 A1* | 9/2009 | Ray | G01V 1/22 367/79 |
| 2009/0303056 A1 | 12/2009 | Bresch et al. | |
| 2011/0145007 A1 | 6/2011 | Romanini | |
| 2011/0226051 A1 | 9/2011 | Al-Wehebi | |
| 2013/0024342 A1 | 1/2013 | Horowitz et al. | |
| 2014/0032704 A1* | 1/2014 | Painter | G08B 27/006 709/217 |
| 2014/0324348 A1 | 10/2014 | Volfson | |
| 2015/0073834 A1 | 3/2015 | Gurenko et al. | |
| 2015/0159337 A1 | 6/2015 | Kellner | |
| 2016/0284029 A1 | 9/2016 | Rhodes et al. | |
| 2017/0104648 A1 | 4/2017 | Meier | |
| 2018/0075537 A1 | 3/2018 | Kaplan et al. | |
| 2019/0377102 A1 | 12/2019 | Glassman et al. | |
| 2021/0192629 A1 | 6/2021 | Tofte et al. | |
| 2021/0209605 A1 | 7/2021 | Glassman et al. | |
| 2022/0155485 A1 | 5/2022 | Glassman et al. | |

FOREIGN PATENT DOCUMENTS

| | | |
|---|---|---|
| CN | 104573363 A | 4/2015 |
| CN | 112567420 A | 3/2021 |
| GB | 2589257 A | 5/2021 |

OTHER PUBLICATIONS

China National Intellectual Property Administration: The Second Chinese Office Action of CN 2020111100545 (related application); dated Jan. 19, 2023; 7 pages.
Chinese Patent Office: Notification of the First Office Action of CN 2020111100545 (related application); dated Aug. 1, 2022; Ying Wang; 23 pages.
Lambrecht et al. "A theory of takeovers and disinvestment", National Bureau of Economic Research, Jan. 2005; 45 pages.
Patent Cooperation Treaty: PCT Application No. PCT/US2016/055697: International Search Report and Written Opinion; 20 pages; dated Feb. 5, 2017; Young, Lee W.
Patent Cooperation Treaty: PCT Application No. PCT/US2019/036630: International Search Report and Written Opinion; 7 pages; dated Aug. 26, 2019; Copenheaver, Blaine R.
Patent Cooperation Treaty: International Search Report and Written Opinion of PCT/US22/21016 (related application); dated Aug. 11, 2022; 23 pgs.
Patent Cooperation Treaty: PCT Application No. PCT/US2016/055697 (related application): International Search Report and Written Opinion; 20 pages; dated Feb. 5, 2017; Young, Lee W.
PCT: International Preliminary Report on Patentability of PCT/US2019/036630; Agnes Wittmann-Regis; dated Dec. 24, 2020; 6 pages.
Sanjuan Margalef, et al.: Hybrid application to accelerate wind field calculation, Aug. 1, 2016, Journal of Computational Science, 17576-577 (Year: 2016).
Swiss Re. "What is parametric insurance?" Aug. 1, 2018 (Aug. 1, 2018) Corporate Solutions; 6 pages.

\* cited by examiner

METHODS, SYSTEMS, AND MEDIA FOR MANAGING WIND SPEED DATA, SEISMIC DATA AND OTHER PARAMETRIC DATA

CROSS-REFERENCE TO RELATED APPLICATIONS

This application is a continuation of U.S. application Ser. No. 17/959,085, filed Oct. 3, 2022, entitled METHODS, SYSTEMS, AND MEDIA FOR MANAGING WIND SPEED DATA, SEISMIC DATA AND OTHER PARAMETRIC DATA, which is a continuation of U.S. patent application Ser. No. 17/468,133, filed on Sep. 7, 2021, entitled METHODS, SYSTEMS, AND MEDIA FOR MANAGING WIND SPEED DATA, SEISMIC DATA AND OTHER NATURAL PHENOMENA DATA, issued as U.S. Pat. No. 11,460,592 on Oct. 4, 2022. U.S. patent application Ser. No. 17/468,133 is a continuation of U.S. patent application Ser. No. 16/533,556, filed on Aug. 6, 2019, entitled METHODS, SYSTEMS, AND MEDIA FOR MANAGING WIND SPEED DATA, SEISMIC DATA AND OTHER NATURAL PHENOMENA DATA, now U.S. Pat. No. 11,112,512, issued on Sep. 7, 2021, which is a continuation-in-part of U.S. patent application Ser. No. 15/285,762 filed on Oct. 5, 2016, entitled METHODS, SYSTEMS, AND MEDIA FOR MANAGING WIND SPEED DATA, issued as U.S. Pat. No. 10,375,182 on Aug. 6, 2019. Application Ser. No. 15/285,762 claims benefit of U.S. Provisional Application No. 62/239,072, filed on Oct. 8, 2015, entitled METHODS, SYSTEMS, AND MEDIA FOR MANAGING WIND SPEED DATA. All the foregoing, including patent application Ser. Nos. 17/959,085, 17/468,133, 16/533,556, 15/285,762 and 62/239,072, and U.S. Pat. Nos. 11,460,592, 11,112,512 and 10,375,182 are incorporated by reference herein in their entirety.

TECHNICAL FIELD

The disclosed subject matter relates to methods, systems, and media for managing wind speed data, seismic data and other natural phenomena data.

BACKGROUND

Devices such as anemometers for the measurement of wind speeds are known, and devices for recording wind speed data are also known. Recorded wind speed data from such devices may be valuable for resolving insurance claims resulting from storm damage. However, during severe weather, or in the aftermath of severe storms, the recording of wind speeds may be interrupted and/or the recorded wind speed data may be lost due to physical damage, lightning strikes, water intrusion, power loss, looting, vandalism or other causes adversely affecting the wind speed measurement and recording devices and/or the media upon which the wind speed data is stored. A need therefore exists, for methods, systems and media for managing wind speed data that are more resistant to damage, interruption and/or data loss during and after severe weather.

Even when recorded wind speed data remains intact, following a severe storm it may be difficult to obtain access to the locations where the recorded wind speed data is stored. This can result in delays in obtaining recorded wind speed data, which in turn can delay the resolution of insurance claims resulting from storm damage. A need therefore exists, for methods, systems and media for managing wind speed data that can transfer the wind speed data in a timely manner from the associated wind measurement stations to remote locations where the data can be evaluated. A need further exists, for methods, systems and media for managing wind speed data that can evaluate wind speed data to determine if certification of the wind speed data is indicated and/or to determine if payment under a contract is indicated.

Seismic waves are waves of energy that travel across the surface of the Earth and through the layers of the Earth as a result of earthquakes, volcanoes, quakes, tremors, temblors and similar natural shaking phenomena and also man-made shaking events such as explosions (hereinafter collectively termed "earthquakes" or "seismic events"). Seismic waves can directly produce destructive effects including ground shaking (i.e., ground acceleration and velocity), ground rupture and soil liquefaction. Seismic waves can also indirectly result in landslides, structure collapses, fires, tsunami and floods. Devices such as seismometers and accelerometers are known for the measurement of seismic waves and the associated ground accelerations and velocities occurring during earthquakes and similar destructive seismic events. Devices are also known for recording seismic wave data, ground acceleration data and/or ground velocity data (hereinafter collectively termed "seismic data") relating to measured seismic waves, accelerations and velocities. Recorded seismic data may be valuable for resolving insurance claims resulting from direct and indirect earthquake damage. However, during earthquakes, or in the aftermath of a seismic event, the recording of seismic data may be interrupted and/or the recorded seismic data may be lost due to physical damage, structure collapse, fire, water intrusion, power loss, looting, vandalism or other causes adversely affecting the seismic measurement and seismic data recording devices and/or the media upon which the seismic data is stored. A need therefore exists, for methods, systems and media for collecting and managing seismic data that are more resistant to damage, interruption and/or data loss during and after a seismic event.

In some areas, and especially in known seismically-active regions, government, university and/or research entities may operate one or more seismic measurement and/or recording devices. By monitoring the seismic waves received at such devices during a seismic event, estimates can be made regarding the overall characteristics of a given earthquake or seismic event such as the approximate magnitude, depth and geographic epicenter. Using the maximum intensity observed near the epicenter of the event and from the extent of the geographic area where the seismic event was felt, a so-called isoseismal map of the event may be produced to show the approximate intensity of local ground shaking across the region, i.e., for geographic areas where no direct measurement or data is available. However, the actual shaking intensity and/or duration experienced at a given geographic location of interest can vary greatly from that estimated in an isoseismal map. In particular, from one geographic location of interest to another, the property damage resulting from a single earthquake or seismic event can vary significantly depending on a number of factors including, but not limited to, the overall magnitude of the seismic event, the distance from the epicenter of the seismic event, the soil conditions at the location of interest, soil conditions intervening between the event epicenter and the location of interest, geological structures at the location of interest and geological structures intervening between the event epicenter and the location of interest.

In view of the factors previously described, using isoseismal map estimates for resolving earthquake/seismic event insurance claims at a specific geographic location of interest event can be problematic because the isoseismal map is not based on actual seismic data relevant to likely property damage measured at the location. Therefore, an isoseismal map-based estimate will not accurately predict the actual conditions experienced during a seismic event and the likely resulting property damage at a specific geographic location. A need therefore exists, for methods, systems and media for collecting and managing seismic data at a given geographic location of interest that are relevant to property damage estimates at the given geographic location of interest.

Even when seismic data is collected for a specific geographic location of interest and remains intact, following a significant seismic event it may be difficult to obtain access to the locations where the recorded seismic data is stored. This can result in delays in obtaining recorded seismic data, which in turn can delay the resolution of insurance claims resulting from earthquake damage at the location. A need therefore exists, for methods, systems and media for managing seismic data that can transfer the seismic data in a timely manner from the associated seismic measurement stations to remote locations where the data can be evaluated. A need further exists, for methods, systems and media for managing seismic data that can evaluate seismic data to determine if certification of the seismic data is indicated and/or to determine if payment under a contract is indicated.

SUMMARY

In some embodiments a wind speed data system can gather wind speed data from an anemometer located at a wind speed station, store the wind speed data on a storage device located at the wind speed station, and transmit the wind speed data to a data server such that the wind speed data can be stored redundantly and protected from data loss resulting from storms or other causes of data loss.

In some other embodiments, a storage device located at the wind speed station can be protected within a housing located below ground. For example, the storage device can be protected by a waterproof, damage resistant housing that can detach from the other components of the wind station in the event of damage being caused to the wind station by excessive wind speeds or other forces.

In still other embodiments, the gathered wind speed data can be used to create a wind speed damage model such that whenever excessive wind speeds are detected at a wind station, an amount of property damage can be estimated based on the wind speeds detected and the wind speed damage model.

In another aspect, a wind station system for collecting and managing wind speed data at a geographic location having a ground level is provided, the system comprising a wind-resistant pole disposed at the geographic location, the pole having a base portion disposed below the ground level and a riser portion extending upward from the base portion. An anemometer is mounted on the riser portion of the pole above the ground level, the anemometer producing wind speed signals indicative of wind speed at the anemometer. A computing device is operatively connected to the anemometer for the receiving the wind speed signals from the anemometer and producing wind speed data corresponding to the received wind speed signals. A housing is disposed at the geographic location but physically separated from both the pole and the anemometer and a storage device is disposed inside the housing and operatively connected to the computing device for receiving wind speed data from the computing device and storing the wind speed data.

In one embodiment, the housing containing the storage device is waterproof and disposed below the ground level.

In another embodiment, the wind station system further comprises an electrical storage battery disposed at the geographic location and operatively connected to at least one of the anemometer, computing device and storage device for supplying electrical power thereto, and a photovoltaic solar panel disposed at the geographic location and operatively connected to the storage battery for charging the storage battery with electrical power.

In yet another embodiment, the operatively connecting between the computing device and the storage device for communication of the wind speed data from the computing device to the storage device is accomplished by a wireless connection.

In a further embodiment, the wireless connection for communication of the wind speed data from the computing device to the storage device is one of cellular mobile device network, Bluetooth, Wi-Fi and near field communication.

In a still further embodiment, the computing device further comprises a communication interface adapted to transmit wind speed data from the storage device to another location using an external communication network.

In another embodiment, the storage device includes a memory for storing the wind speed data, and the memory is at least one of a random access memory, a read-only memory, a flash memory, a hard disk drive, a solid-state drive, a removable memory card, a removable USB memory stick, and an optical drive and optical media.

In another aspect, a system for collecting and managing wind speed data via an external communications network is provided. The system comprises one or more wind station, each respective wind station being disposed at a respective wind station location and including, respectively, an anemometer disposed at the respective wind station location and producing wind speed signals indicative of wind speeds at the respective wind station location, a station computing device disposed at the respective wind station location and operatively connected to the anemometer for receiving the wind speed signals and producing wind speed data corresponding to the wind speed signals, a station memory disposed at the respective wind station location and operatively connected to the station computing device for storing the wind speed data, and a station communication interface disposed at the respective wind station location, the station communication interface being operatively connected to the station computing device to receive wind speed data therefrom, and being operatively connected to an external communication network to the transmit wind speed data to the external communications network. The system further comprises one or more data server, each respective data server being disposed at a respective data server location and including, respectively, a server computing device disposed at the respective data server location, a server communication interface disposed at the respective data server location, the server communication interface being operatively connected to the external communication network to receive respective wind speed data from the one or more wind stations and operatively connected to the server computing device to provide the received respective wind speed data to the server computing device, and a server memory disposed at the respective data server location and operatively connected to the server computing device for storing the received respective wind speed data. The one or more data server can transmit the stored received respective wind speed data to another location on the external communications network.

In one embodiment, the one or more wind station are further adapted to store a plurality of respective individual anemometer readings in the respective station memory over a predetermined time period, to convert the plurality the respective individual anemometer readings over the predetermined time period into a respective average wind speed for the predetermined time period, and to transmit the respective average wind speed for the predetermined time period to the one or more data server over the external communications network.

In another embodiment, the one or more wind station are further adapted to store a plurality of respective individual anemometer readings in the respective station memory over a predetermined time period, to convert the plurality the respective individual anemometer readings over the predetermined time period into a respective maximum wind speed for the predetermined time period, and to transmit the respective maximum wind speed for the predetermined time period to the one or more data server over the external communications network.

In yet another embodiment, the system further comprises one or more certification server, each respective certification server being disposed at a respective certification server location and including, respectively, a certification server computing device disposed at the respective certification server location and a certification server communication interface disposed at the respective certification server location, the certification server communication interface being operatively connected to the external communication network to receive respective wind speed data from the one or more data servers and operatively connected to the certification server computing device to provide the received respective wind speed data to the certification server computing device. Each of the one or more certification server can generate a respective data model, the respective data model comprising at least one of a historical storm model and a wind speed damage model. Each of the one or more certification server can generate a respective certification report based on the received respective wind speed data and the generated respective data models. The one or more certification server can transmit the generated respective certification report to another location on the external communications network.

In a further embodiment, the system further comprises one or more payout server, each respective payout server being disposed at a respective payout server location and including, respectively, a payout server computing device disposed at the respective payout server location and a payout server communication interface disposed at the respective payout server location, the payout server communication interface being operatively connected to the external communication network to receive the respective certification reports from the one or more certification server and to provide the received respective certification reports to the payout server computing device. Each of the one or more payout server can determine if a received respective certification report satisfied the terms of a respective associated contract.

In a still further embodiment, each of the one or more payout server, upon determining that the received respective certification report satisfies the terms of the respective associated contract, triggers a respective payout in accordance with the respective associated contract at another location by communicating over the external communication network.

In yet another aspect, a method for collecting and managing wind speed data is provided. The method comprises measuring wind speeds at a one or more geographic location and producing respective wind speed signals indicative of the respective measured wind speeds at each respective one or more geographic location, wherein the respective wind speed signals are one of electric signals and electronic signals. The method further comprises converting respective wind speed signals into respective wind speed data at each respective one or more geographic location, wherein the respective wind speed data is digital data, storing the respective wind speed data at each respective one or more geographic location, wherein the respective wind speed data is stored in a digital data format, and transmitting the respective stored wind speed data at each respective one or more geographic location as digital data onto an external communications network. The method further comprises receiving, at one or more data server, the respective wind speed data as digital data for the respective one or more geographic location from the external communication network, storing the received respective wind speed data for the respective one or more geographic location on the one or more data server and determining, at the one or more data server, if the respective one or more wind speed data for each of the respective one or more geographic location are to be sent for certification. When it is determined that the one or more respective wind speed data for the respective one or more geographic location are to be sent for certification, the method further comprises transmitting the respective one or more wind speed data for the respective one or more geographic location as digital data onto an external communications network and receiving, at one or more certification server, the respective wind speed data for the respective one or more geographic location as digital data from the external communication network.

In one embodiment, the method further comprises storing a plurality of the respective wind speed data for a particular one of the one or more geographic location over a predetermined time period, converting the stored plurality of the respective wind speed data for the particular one of the one or more geographic location over the predetermined time period into at least one of an average wind speed for the predetermined time period at the particular one of the one or more geographic location, and a maximum wind speed for the predetermined time period at the particular one of the one or more geographic location, and determining, for the predetermined time period at the particular one of the one or more geographic locations, if the respective average wind speed or maximum wind speed exceeds a predetermined threshold for the respective average wind speed or maximum wind speed. When it is determined that the respective average wind speed or maximum wind speed exceeded a predetermined threshold for the respective average wind speed or maximum wind speed, the method further comprises transmitting and alert signal as digital data to a user device using the external communications network.

In another embodiment, the method further comprises generating, in response to receiving at the one or more certification server the respective wind speed data for the respective one or more geographic location from the external communication network, at least one of a historical storm model and a wind speed damage model, generating a certification report for the respective one or more geographic location based on both the respective wind speed data for the respective one or more geographic location and the at least one of generated historical storm model and wind speed damage model and transmitting the certification report for the respective one or more geographic location as digital data onto the external communications network.

In yet another embodiment, the method further comprises determining, in response to receiving the certification report for the respective one or more geographic location from the external communication network, whether the terms of an associated contract are satisfied. When it is determined in response to receiving the certification report that the terms of an associated contract are satisfied, the method further comprises triggering a payout in accordance with the associated contract by communicating digital data onto the external communications network.

In another aspect, a seismic station system for collecting and managing seismic data at a geographic location is provided, the system comprising a seismic measuring apparatus disposed at the geographic location, wherein the seismic measuring apparatus is one of a seismometer and an accelerometer. The seismic measuring apparatus produces seismic signals indicative of seismic or acceleration conditions at the geographic location. A processor is operatively connected to the seismic measuring apparatus for the receiving the seismic signals from the seismic measuring apparatus and producing seismic data corresponding to the received seismic signals. A housing is disposed at the geographic location and a memory is disposed inside the housing and operatively connected to the processor for receiving seismic data from the processor and storing the seismic data. A computing device is operably connected to the memory for communication with the memory for transmitting the seismic data from the memory to the computing device.

In one embodiment, the housing containing the memory is formed of a damage-resistant material, wherein the damage-resistant material is primarily concrete or steel.

In another embodiment, the seismic station system further comprises an electrical storage battery disposed at the geographic location and operatively connected to at least one of the seismic measurement apparatus, processor and memory for supplying electrical power thereto.

In yet another embodiment, the operative connection between the memory and the computing device for transmitting the seismic data from the memory to the computing device includes a wireless connection.

In still another embodiment, the wireless connection for transmitting the seismic data from the memory to the computing device is one of cellular mobile device network, Bluetooth, Wi-Fi and near field communication.

In a further embodiment, the computing device further comprises a communication interface adapted to transmit the seismic data from the memory to another location using an external communication network.

In a still further embodiment, the memory for storing the seismic data is at least one of a random access memory, a read-only memory, a flash memory, a hard disk drive, a solid-state drive, a removable memory card, a removable USB memory stick, and an optical drive and an optical media.

In another aspect, a system for collecting and managing seismic data via an external communications network comprises one or more seismic station. Each respective seismic station is disposed at a respective seismic station location and includes, respectively: a seismic measurement apparatus disposed at the respective seismic station location and producing seismic signals indicative of seismic or acceleration conditions at the respective seismic station location; a station processor disposed at the respective seismic station location and operatively connected to the seismic measuring apparatus for receiving the seismic signals and producing seismic data corresponding to the seismic signals; a station memory disposed at the respective seismic station location and operatively connected to the station processor for storing the seismic data; and a station computing device having a communication interface disposed at the respective seismic station location, the communication interface being operatively connected to the station processor to receive the seismic data therefrom, and being operatively connected to an external communication network to the transmit the seismic data to the external communications network. The system further comprises one or more data server, each respective data server being disposed at a respective data server location and including, respectively: a server computing device disposed at the respective data server location; a server communication interface disposed at the respective data server location, the server communication interface being operatively connected to the external communication network to receive respective seismic data from the one or more seismic stations and operatively connected to the server computing device to provide the received respective seismic data to the server computing device; and a server memory disposed at the respective data server location and operatively connected to the server computing device for storing the received respective seismic data. The one or more data server can transmit the stored received respective seismic data to another location on the external communications network.

In one embodiment, the one or more seismic station are further adapted to store a plurality of respective individual seismic data values in the respective station memory over a predetermined time period, to convert the plurality the respective individual seismic data values over the predetermined time period into a respective average seismic data value for the predetermined time period, and to transmit the respective average seismic data value for the predetermined time period to the one or more data server over the external communications network.

In another embodiment, the one or more seismic station are further adapted to store a plurality of respective individual seismic data values in the respective station memory over a predetermined time period, to convert the plurality the respective individual seismic data values over the predetermined time period into a respective maximum seismic data value for the predetermined time period, and to transmit the respective maximum seismic data value for the predetermined time period to the one or more data server over the external communications network.

In yet another embodiment, the system further comprises one or more certification server, each respective certification server being disposed at a respective certification server location and including, respectively: a certification server computing device disposed at the respective certification server location; and a certification server communication interface disposed at the respective certification server location, the certification server communication interface being operatively connected to the external communication network to receive respective seismic data from the one or more data servers and operatively connected to the certification server computing device to provide the received respective seismic data to the certification server computing device. Each of the one or more certification server can generate a respective data model, the respective data model comprising at least one of a historical earthquake or seismic event model and an earthquake or seismic event damage model. Each of the one or more certification server can generate a respective certification report based on the received respective seismic data and the generated respective data models. The one or more certification server can transmit the generated respective certification report to another location on the external communications network.

In still another embodiment, the system further comprises one or more payout server, each respective payout server being disposed at a respective payout server location and including, respectively: a payout server computing device disposed at the respective payout server location; and a payout server communication interface disposed at the respective payout server location, the payout server communication interface being operatively connected to the external communication network to receive the respective certification reports from the one or more certification server and to provide the received respective certification reports to the payout server computing device. Each of the one or more payout server can determine if a received respective certification report satisfied the terms of a respective associated contract.

In a further embodiment, each of the one or more payout server, upon determining that the received respective certification report satisfies the terms of the respective associated contract, triggers a respective payout in accordance with the respective associated contract at another location by communicating over the external communication network.

In yet another aspect, a method for collecting and managing seismic data comprises measuring seismic or acceleration conditions at a one or more geographic location and producing respective seismic signals indicative of the respective measured seismic or acceleration conditions at each respective one or more geographic location, wherein the respective seismic signals are one of electric signals and electronic signals. The respective seismic signals are converted into respective seismic data at each respective one or more geographic location, wherein the respective seismic data is digital data. The respective seismic data are stored at each respective one or more geographic location, wherein the respective seismic data is stored in a digital data format. The respective stored seismic data are transmitted at each respective one or more geographic location as digital data onto an external communications network. At one or more data server, the respective seismic data is received as digital data for the respective one or more geographic location from the external communication network. The received respective seismic data for the respective one or more geographic location is stored on the one or more data server. At the one or more data server, it is determined if the respective one or more seismic data for each of the respective one or more geographic location are to be sent for certification, and when it is determined that the one or more respective seismic data for the respective one or more geographic location are to be sent for certification, the respective one or more seismic data for the respective one or more geographic location are transmitted as digital data onto an external communications network. At one or more certification server, the respective seismic data for the respective one or more geographic location is received as digital data from the external communication network.

In one embodiment, the method further comprises storing a plurality of the respective seismic data values for a particular one of the one or more geographic location over a predetermined time period, and converting the stored plurality of the respective seismic data values for the particular one of the one or more geographic location over the predetermined time period into at least one of an average seismic value for the predetermined time period at the particular one of the one or more geographic location, and a maximum seismic value for the predetermined time period at the particular one of the one or more geographic location. The method further comprises determining, for the predetermined time period at the particular one of the one or more geographic locations, if the respective average seismic value or maximum seismic value exceeds a predetermined threshold for the respective average seismic value or maximum seismic value. When it is determined that the respective average seismic value or maximum seismic value exceeded a predetermined threshold for the respective average seismic value or maximum seismic value, an alert signal is transmitted as digital data to a user device using the external communications network.

In another embodiment, the method further comprises generating, in response to receiving at the one or more certification server the respective seismic data for the respective one or more geographic location from the external communication network, at least one of a historical earthquake or seismic event model and a earthquake or seismic event damage model. A certification report is generated for the respective one or more geographic location based on both the respective seismic data for the respective one or more geographic location and the at least one of generated historical earthquake or seismic event model and earthquake or seismic event damage model. The certification report for the respective one or more geographic location is transmitted as digital data onto the external communications network.

In yet another embodiment, the method further comprises determining, in response to receiving the certification report for the respective one or more geographic location from the external communication network, whether the terms of an associated contract are satisfied. When it is determined in response to receiving the certification report that the terms of an associated contract are satisfied, a payout is triggered in accordance with the associated contract by communicating digital data onto the external communications network.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 1A shows an enlarged view of an anemometer suitable for use in some embodiments of the wind station system of FIG. 1;

DETAILED DESCRIPTION

In accordance with various embodiments of the disclosed subject matter, mechanisms (which can include methods, systems, and media) for managing wind speed data are described herein.

Figure 1:
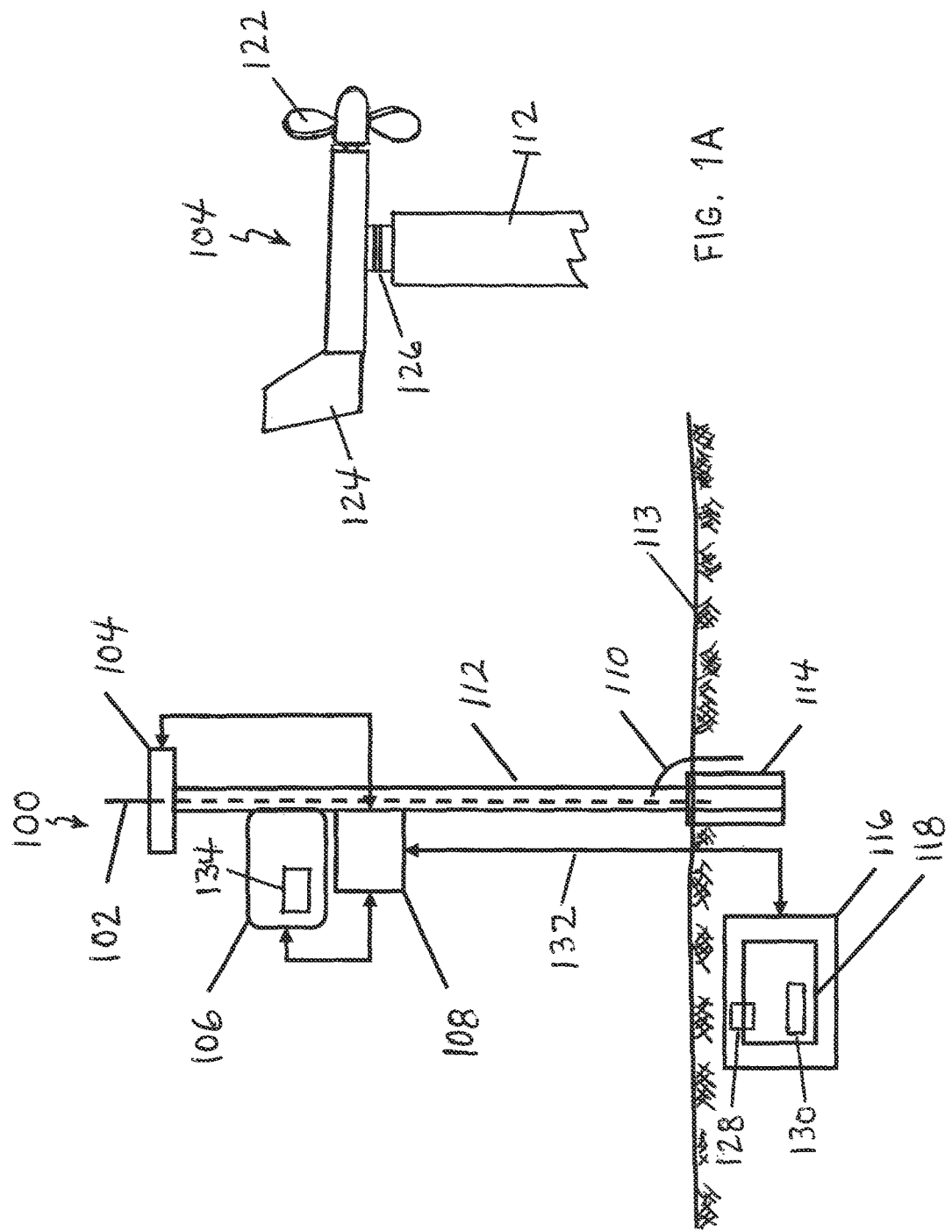
FIG. 1 shows an example of a wind station system for managing wind speed data in accordance with some embodiments of the disclosed subject matter.

Referring now FIG. 1, there is illustrated an example of a wind station system 100 for managing wind speed data in accordance with some embodiments of the disclosed subject matter. In some embodiments, the wind station system 100 is disposed at a particular geographic location and manages wind speed data for winds occurring at the particular geographic location. As shown, in some embodiments, system 100 can include a lightning terminal 102, an anemometer 104, a solar panel 106, a computing device 108, a ground wire 110, a pole 112, a pole foundation 114, a housing 116 and a storage device 118. In some embodiments, all of these elements can be disposed at the particular geographic location, whereas in other embodiments, some of the elements may be disposed at different geographic locations. It should be understood that although only one of each of these elements is shown in FIG. 1, more than one of each of these elements can be used in some embodiments.

In some embodiments, any lightning terminal 102 suitable for conducting the electric charge of a lightning strike away from other components can be used. For example, the lighting terminal 102 can comprise an electrically conductible rod, an electrically conductible wire, and/or any other electrically conductible part or assembly of parts.

In some embodiments, the lightning terminal 102 can be connected to the ground wire 110 such that in the event of a lightning strike, the electric charge will be grounded to the earth 120. In some embodiments, any suitable ground wire 110 can be used. For example, the ground wire 110 can be a copper wire, a shielded wire, an insulated wire and/or any other type of wire suitable for grounding an electric charge.

In some embodiments, the ground wire 110 can be inserted at any suitable depth into the earth 120. For example, a ground wire 110 can be inserted into the earth 120 to a depth of 20 feet below the ground level 113 (i.e., surface) at the location.

Referring still to FIG. 1, and now also to FIG. 1A, in some embodiments, any anemometer 104 suitable for measuring wind speeds can be used. For example, referring now specifically to FIG. 1A, in the illustrated embodiment the anemometer 104 may include a propeller 122. In some such embodiments, the anemometer 104 can produce an electrical signal when the propeller 122 is rotated by wind. In a more particular example, the propeller 122 can produce an AC sine wave electrical signal. In another more particular example, the propeller 122 can be configured to produce an electrical signal directly proportional to wind speed. The anemometer 104 may further include a tail assembly 124 and a swivel bearing 126 rotatably connected to the pole 112, whereby the action of the wind on the tail assembly causes the anemometer to rotate horizontally on the swivel bearing to keep the propeller 122 facing into the wind. In some embodiments, the anemometer 104 can be implemented without a propeller using other moving apparatus, for example, moving cups, vanes, rotors and/or with non-moving apparatus, for example, a pitot tube assembly, to measure the wind speed. In other embodiments, the anemometer 104 can produce electrical signals (e.g., analog voltage, current, frequency or phase signals) or electronic signals (e.g., digital electric signals) proportional to the measured wind speed and/or indicative of the measured wind speed at the anemometer's geographic location.

Figure 3:
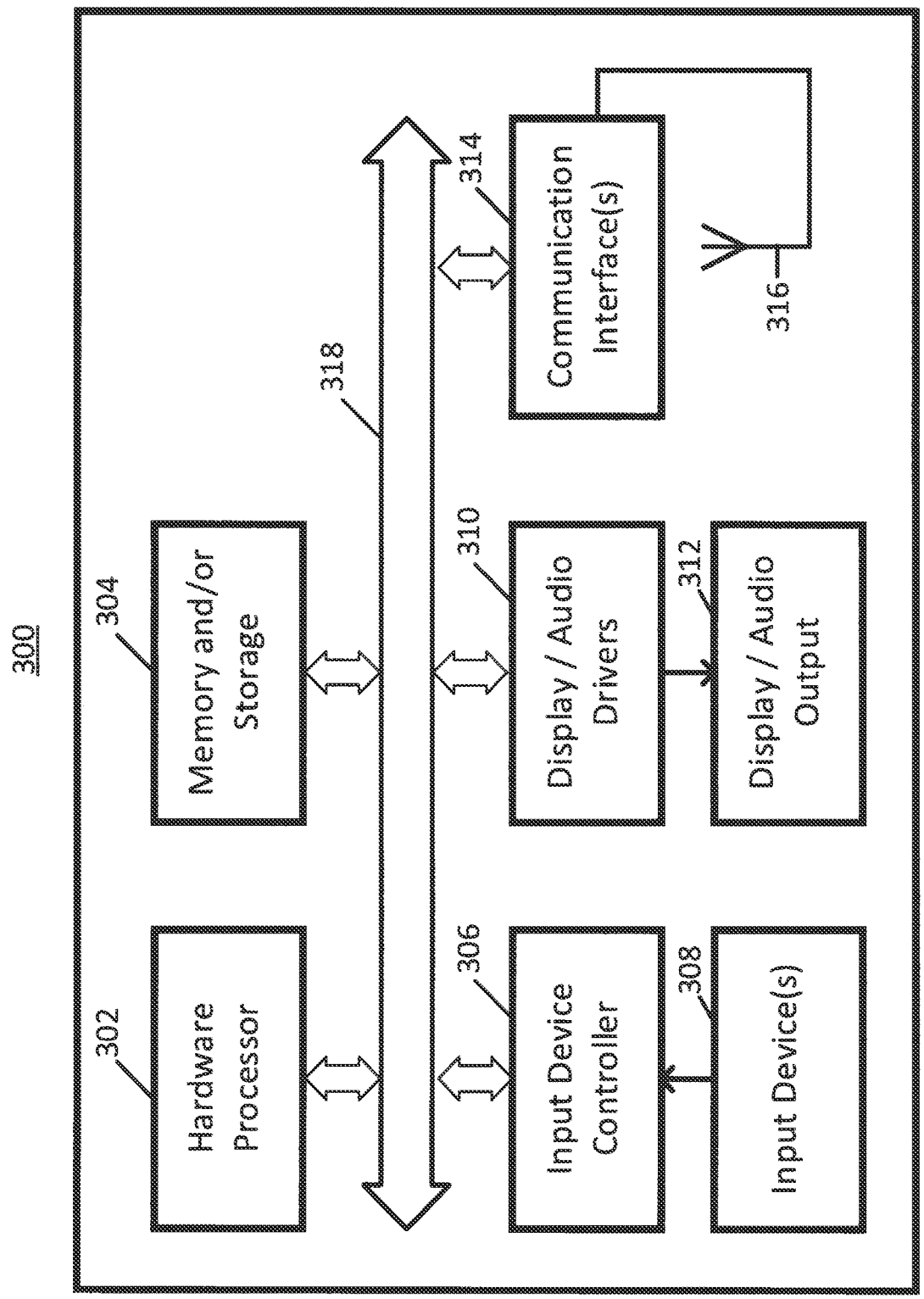
FIG. 3 shows an example of hardware implemented as a computing device in accordance with some embodiments of the disclosed subject matter.

Referring now to FIG. 3, there is illustrated one example of computer hardware 300 implemented as the computing device 108 in accordance with one embodiment. In some other embodiments, any suitable computing device 108 can be used. As illustrated in FIG. 3, the computer hardware 300 can include a hardware processor 302, a memory and/or storage 304, an input device controller 306, an input device 308, display/audio drivers 310, display and audio output circuitry 312, a communication interface(s) 3141, an antenna 316 and a bus 318.

The hardware processor 302 can include any suitable hardware processor, such as a microprocessor, a microcontroller, digital signal processor(s), dedicated logic, and/or any other suitable circuitry for controlling the functioning of a general purpose computer or a special purpose computer in some embodiments. In some embodiments, the hardware processor 302 can be controlled by a program stored in the memory and/or storage 304. For example, the program can cause the hardware processor 302 to perform the mechanisms and/or processes described herein for managing wind speed data, and/or perform any other suitable actions.

The memory and/or storage 304 can be any suitable memory and/or storage for storing application information, programs, data, and/or any other suitable information in some embodiments. For example, the memory and/or storage 304 can include random access memory ("RAM"), read-only memory ("ROM"), flash memory, hard disk storage, optical media and/or any other suitable memory.

The input device controller 306 can be any suitable circuitry for controlling and receiving input from one or more input devices 308 in some embodiments. For example, the input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, from a wind speed sensor (e.g., the anemometer 104 of FIG. 1) and/or from any other type of input device.

The display/audio drivers 310 can be any suitable circuitry for controlling and driving output to one or more display/audio output devices 312 in some embodiments. For example, the display/audio drivers 310 can be circuitry for driving a touchscreen, a flat-panel display, a cathode ray tube display, a projector, a speaker or speakers and/or any other suitable display and/or presentation devices.

The communication interface(s) 314 can be any suitable circuitry for interfacing with one or more communication networks, such as the communication network 210 shown in FIG. 2 and described below. For example, the interface(s) 314 can include network interface card circuitry, wireless communication circuitry and/or any other suitable type of communication network circuitry. The communication interface(s) 314 can also include circuitry for interfacing with external devices including the storage device 118 and/or the memory 130 for storing and/or retrieving wind speed data from the storage device and/or the memory. In some embodiments, the wind speed data can be stored in the storage device 118 and/or the memory 130 as digital data and/or can be transmitted to, or received from, the communication network 210 as digital data.

The antenna 316 can be any of one or more suitable antennas for wirelessly communicating with a communication network (e.g., the communication network 210 of FIG. 2 as described below) in some embodiments. In some embodiments, the antenna 316 can be omitted.

The bus 318 can be any suitable mechanism for communicating between two or more components 302, 304, 306, 310 and 314 in some embodiments. The communication between the components of the computer hardware 300 along the data bus 318 can be implemented as digital data.

Any other suitable components can be included in hardware 300 in accordance with some embodiments.

Referring again to FIG. 1, the pole 112 can include a base portion disposed below the surface of the ground (i.e., below the ground level 113) and a riser portion extending upward from the base portion. In some embodiments, the base portion of the pole 112 can be supported by a pole foundation 114. Any suitable pole foundation 114 can be used in some embodiments. For example, the pole foundation 114 can be implemented as stone (e.g., FDOT #57 stone) backfilled about the pole 112. In some embodiments, the pole 112 may be a concrete pole or a steel pole.

In some embodiments, the pole foundation 114 can be configured such that the pole 112 can sustain wind speeds of one hundred sixty miles per hour. For example, the pole foundation 114 can comprise a two and one-half foot diameter cylinder extending fourteen feet underground (i.e., below the surface of the ground) and configured such that the pole 112 is above a one foot layer of the foundation material.

In some embodiments, the housing 116 for the storage device 118 can be implemented as any housing suitable for underground containment. For example, the housing 116 can include any suitable waterproof material, or combination of waterproof materials such as rubber, polyvinyl chloride (PVC), polyurethane, silicone rubber, and/or any other suitable waterproof material. As another example, the housing 116 can include any suitable non-waterproof material coated with a waterproof material. As a more particular example, the housing 116 can include a concrete housing coated with a bitumen membrane, a PVC membrane, a liquid rubber coating, an elastomeric coating, and/or any other coating material or method. As yet another example, the housing 116 can be any suitable safe (i.e., vault), which can be encased in cement to hold it in place. In preferred embodiments, the housing 116 is disposed below the ground level 113 to provide increased protection and security.

In some embodiments, the housing 116 can include a security device 128. For example, the housing 116 can include a safe/vault equipped with a locking device. As another example, the housing 116 can include a locking mechanism (e.g., a combination locking mechanism or a key locking mechanism).

In some embodiments, the housing 116 can contain any suitable storage device 118. For example, the storage device 118 can be any suitable memory 130 and/or storage for storing application information, programs, data and/or any other suitable information in some embodiments. The storage of the information, programs, data and/or other suitable information on the storage device 118 and/or the memory 130 can be implemented as digital data in any digital data format. As another example, the storage device 118 and memory 130 can include random access memory ("RAM"), read-only memory ("ROM"), flash memory, hard disk drive(s) ("HIDD"), solid-state drive(s) ("SSD"), memory card(s) (for example, but not limited to, "CompactFlash" cards, "SecureDigital" cards, "Memory Stick" cards), a removable USB memory stick, optical drives and optical media (for example, but not limited to, CD drives and CD discs, DVD drives and DVD discs, and Blu-ray drives and Blu-ray discs) and/or any other suitable memory.

In some embodiments, the storage device 118 can be configured inside the housing 116 such that the storage device can remain operable in the event of damage being caused to the above-ground components of the wind station 100. For example, the housing 116 can remain unattached to the pole 112 or pole foundation 114. In such an example, the memory 130 can include a wireless communication module, such as Bluetooth, Wi-Fi, near field communication radio, cellular mobile device network and/or any other wireless communication module suitable for allowing the memory to receive data (indicated in FIG. 1 by arrow 132) wirelessly from the computing device 108 and/or the anemometer 104. As another example, the memory 130 can be communicatively attached to the computing device 108, anemometer 104 and/or other components of the wind station 100 such that in the event of damage to the other components, the memory can be detached. As a more particular example, the memory 130 and/or the housing 116 can be attached to other components at least in part by a shear pin, the shear pin configured such that the memory and/or the housing can detach from the other components in the event that significant force (e.g., tensile force and/or shearing force) is applied to the memory and/or the housing.

In some embodiments, any suitable solar panel configuration can be used for the solar panel 106. For example, the solar panel 106 can be mounted on the pole 112 such that the solar panel can detach from the pole and/or other components in the event of extreme winds. As another example, a solar panel 106 can be configured with a battery 134 operatively connected (indicated in FIG. 1 by arrows 136) to some or all of the other components (e.g., the anemometer 104, computing device 108 and/or storage device 118), such that the solar panel can provide power to the other components without interruption. As a more particular example, the solar panel 106 can be configured with a battery 134 such that the battery can store enough charge to power the other components for ten or more days.

Figure 2:
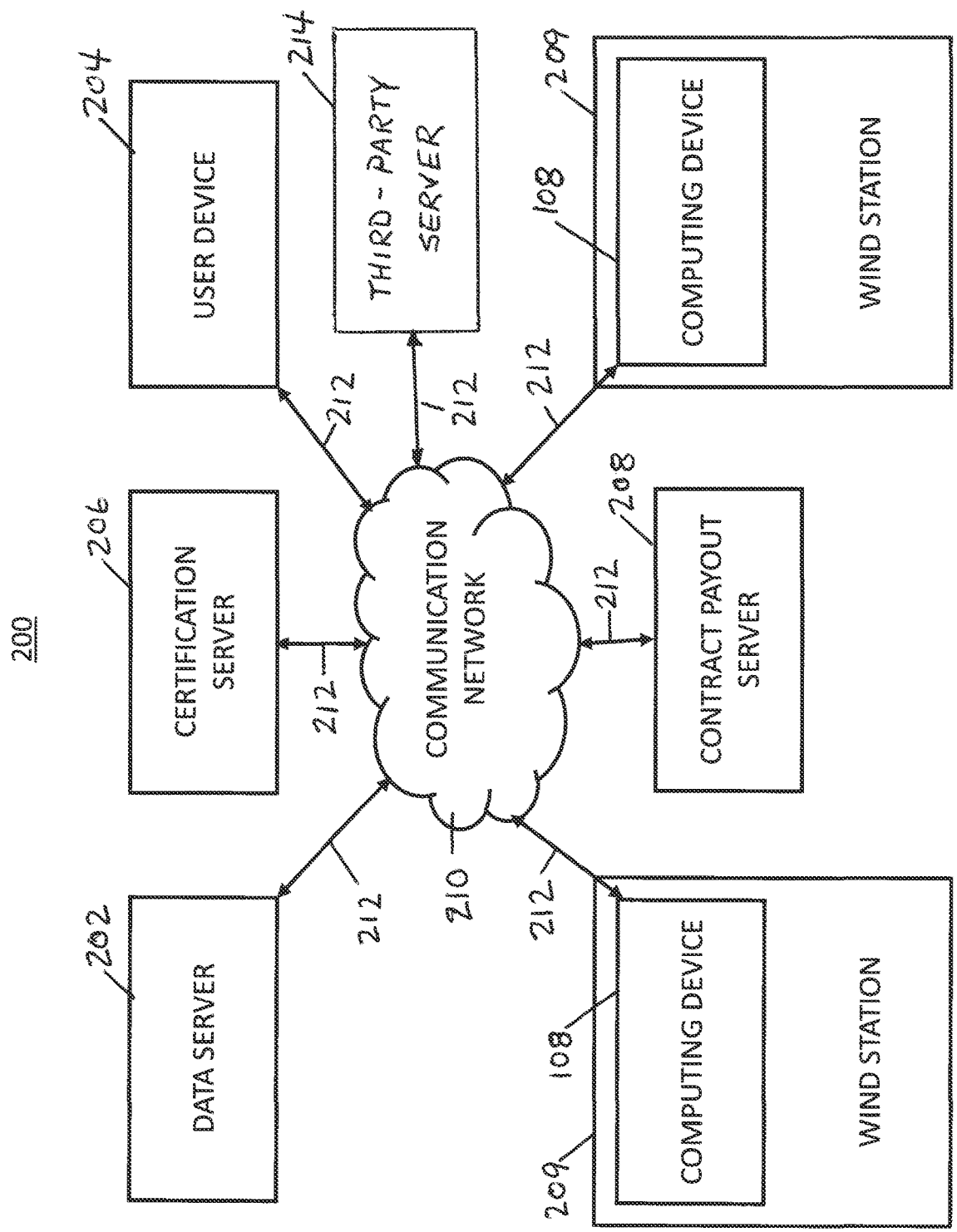
FIG. 2 shows an example of hardware for managing wind speed data that can be used in accordance with some embodiments of the disclosed subject matter.

Referring now to FIG. 2, there is illustrated one example of system hardware 200 for managing wind speed data that can be used in accordance with some embodiments of the disclosed subject matter. As illustrated, the system hardware 200 can include one or more: data servers 202, user devices 204, certification servers 206, contract payout servers 208 and wind stations 209 outfitted with computing devices 108.

In some embodiments, the wind station 209 can be any suitable wind station configured with a computing device 108. For example, as shown in FIG. 1, the wind station 209 can be the wind station system 100 disposed at a particular geographic location.

In some embodiments, the data server 202 can be any suitable server for storing data and/or delivering the data to a user device 204. In some embodiments, the data stored by the data server 202 and/or delivered to the user device 204 can be implemented as digital data in any digital data format.

For example, the data server 202 can be a server that delivers data to a user device 204 and/or receives data from a wind station 209 via a communication network 210. In some embodiments, the data server 202 can include a server computing device, a server communication interface operatively connected to the communication network 210 to receive respective wind speed data from one or more wind stations 209 and operatively connected to the server computing device to provide the received respective wind speed data to the server computing device and a server memory disposed at the respective data server location and operatively connected to the server computing device for storing the received respective wind speed data. Data stored and/or delivered by the data server 202 can be any suitable data, such as wind speed data, wind direction data, historical weather data, contract data, contract payout data and/or any other suitable data. Data can be recorded and uploaded to the data server 202 by any suitable entity (e.g., a wind station computing device 108). In some embodiments, the data server 202 can be disposed at a geographic location that is remote from (i.e., geographically distant from) the wind station system 100, whereas in other embodiments, the data server can be disposed at the same geographic location as the wind station system. In some embodiments having more than one wind station system 100, each respective wind station system can be disposed at a different respective wind station location, and the data server 202 can be disposed at a data server location that is remote from at least one of the respective wind station locations. In some embodiments having more than one wind station system 100 and more than one data server 202, each respective wind station system can be disposed at a different respective wind station location, and each respective data server 202 can be disposed at a different respective data server location, wherein the respective wind station locations and data server locations are all geographically remote from one another. In some other embodiments, the data server 202 can be omitted.

The communication network 210 can be any suitable combination of one or more wired and/or wireless networks in some embodiments. For example, the communication network 210 can include anyone or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. The user device 204 can be connected by one or more communications links 212 to the communication network 210, which can be linked via one or more communications links to the data server 202, and/or wind stations 209. The communications links 212 can be any communications links suitable for communicating data among the user device 204, data server 202 and wind stations 209, such as network links, dial-up links, wireless links, hard-wired links, any other suitable communications links, or any suitable combination of such links. In some embodiments, the data communicated across the communication network 210 and/or communication links 212 can be implemented as digital data in any digital data format.

The user device 204 can include anyone or more user devices suitable for requesting data, searching for data, viewing data, retransmitting data, manipulating data, receiving a user input and/or any other suitable functions. For example, in some embodiments, the user device 204 can be implemented as a mobile device, such as a mobile phone, a tablet computer, a laptop computer and/or any other suitable mobile device. As another example, in some embodiments, the user device 204 can be implemented as a non-mobile device such as a desktop computer and/or any other suitable non-mobile device. In some embodiments, the user device 204 can be disposed at a geographic location that is remote from (i.e., geographically distant from) the wind station system 100 and/or the data server 202, whereas in other embodiments, the user device can be disposed at the same geographic location as the wind station system and/or the data server.

In some embodiments, the contract payout server 208 can be any suitable server for causing a contract to be paid out based on wind speed data. For example, the contract payout server 208 can be a server that receives wind speed data from a data server 202 via a communication network 210, and/or determines whether a contract should be paid out based on wind speed data and/or causes a third party server 214 to payout a contract by communicating with the third party server over a communication network 210. The storage of the wind speed data and other information, programs, data and/or other suitable information on the contract payout server 208 can be implemented as digital data in any digital data format. In some embodiments, the payout server 208 can include a payout server computing device, a payout server communication interface operatively connected to the communication network 210 to receive respective certification reports from one or more certification servers 206 and operatively connected to the payout server computing device to provide the received respective certification reports to the payout server computing device, and/or a payout server memory operatively connected to the payout server computing device for storing the received respective certification reports. In some embodiments, the payout server computing device can determine if a received respective certification report satisfied the terms of an associated contract, and if so, the payout server can trigger a payout at another location by communicating over the communication network 210. In some embodiments, the contract payout server 208 can be disposed at a geographic location that is remote from (i.e., geographically distant from) the wind station system 100, the data server 202 and/or the user device 204, whereas in other embodiments, the contract payout server can be disposed at the same geographic location as the wind station system, the data server and/or the user device.

In some embodiments, the certification server 206 can be any suitable server for certifying wind speed data. For example, the certification server 206 can be a server that receives wind speed data from a data server 202 via a communication network 210, and/or stores historical wind speed data and/or determines whether wind speed data is accurate. The storage of the wind speed data and other information, programs, data and/or other suitable information on the certification server 206 can be implemented as digital data in any digital data format. In some embodiments, the certification server 206 can include a certification server computing device, a certification server communication interface operatively connected to the communication network 210 to receive respective wind speed data from one or more data servers 202 and operatively connected to the certification server computing device to provide the received respective wind speed data to the certification server computing device, and/or a certification server memory operatively connected to the certification server computing device for storing the received respective wind speed data. In some embodiments, the certification server computing device can generate a data model, for example a historical storm model or a wind speed damage model, and the generated data model can be transmitted by the certification server communication interface to another location on the communication network 210. In some embodiments, the certification server computing device can generate a certification report based on the received wind speed data and the generated data model, and the certification report can be transmitted by the certification server communication interface to another location on the communication network 210. In some embodiments, the certification server 206 can be disposed at a geographic location that is remote from (i.e., geographically distant from) the wind station system 100, the data server 202, the user device 204 and/or the contract payout server 208, whereas in other embodiments, the contract payout server can be disposed at the same geographic location as the wind station system, the data server, the user device and/or the contract payout server.

Although the data server 202 and the user device 204 are illustrated as separate devices in FIG. 2, the functions performed by the data server and the user device can be performed using any suitable number of devices in some embodiments. For example, in some embodiments, the functions performed by either the data server 202 or the user device 204 can be performed on a single device. As another example, in some embodiments, multiple devices can be used to implement the functions performed by the data server 202 and the user device 204.

Although the data server 202, certification server 206, and the contract payout server 208 are illustrated as separate devices in FIG. 2, the functions performed by the data server, certification server and the contract payout server can be performed using any suitable number of devices in some embodiments. For example, in some embodiments, the functions performed by either the data server 202, the certification server 206, or the contract payout server 208 can be performed on a single device. As another example, in some embodiments, multiple devices can be used to implement the functions performed by the data server 202, the certification server 206 and the contract payout server 208.

Although only two wind stations 209, one certification server 206, one contract payout server 208, one data server 202, one user device 204 and one third-party server 214 are shown in FIG. 2 to avoid over-complicating the figure, any suitable number and/or any suitable types of wind stations, data servers, user devices and third-party servers can be used in some embodiments.

The data server 202, the user device 204, and the wind station computing devices 108 can be implemented using any suitable hardware in some embodiments. For example, in some embodiments, the data server 202, the user device 204 and the wind station computing devices 108 can be implemented using any suitable general purpose computer or special purpose computer. For example, the wind station computing device 108 may be implemented using a special purpose computer. Any such general purpose computer or special purpose computer can include any suitable hardware. For example, referring again to FIG. 3, as illustrated in example computer hardware 300, such hardware can include a hardware processor 302, a memory and/or storage 304, an input device controller 306, an input device 308, display/audio drivers 310, display and audio output circuitry 312, a communication interface(s) 314, an antenna 316 and a bus 318.

Figure 4:
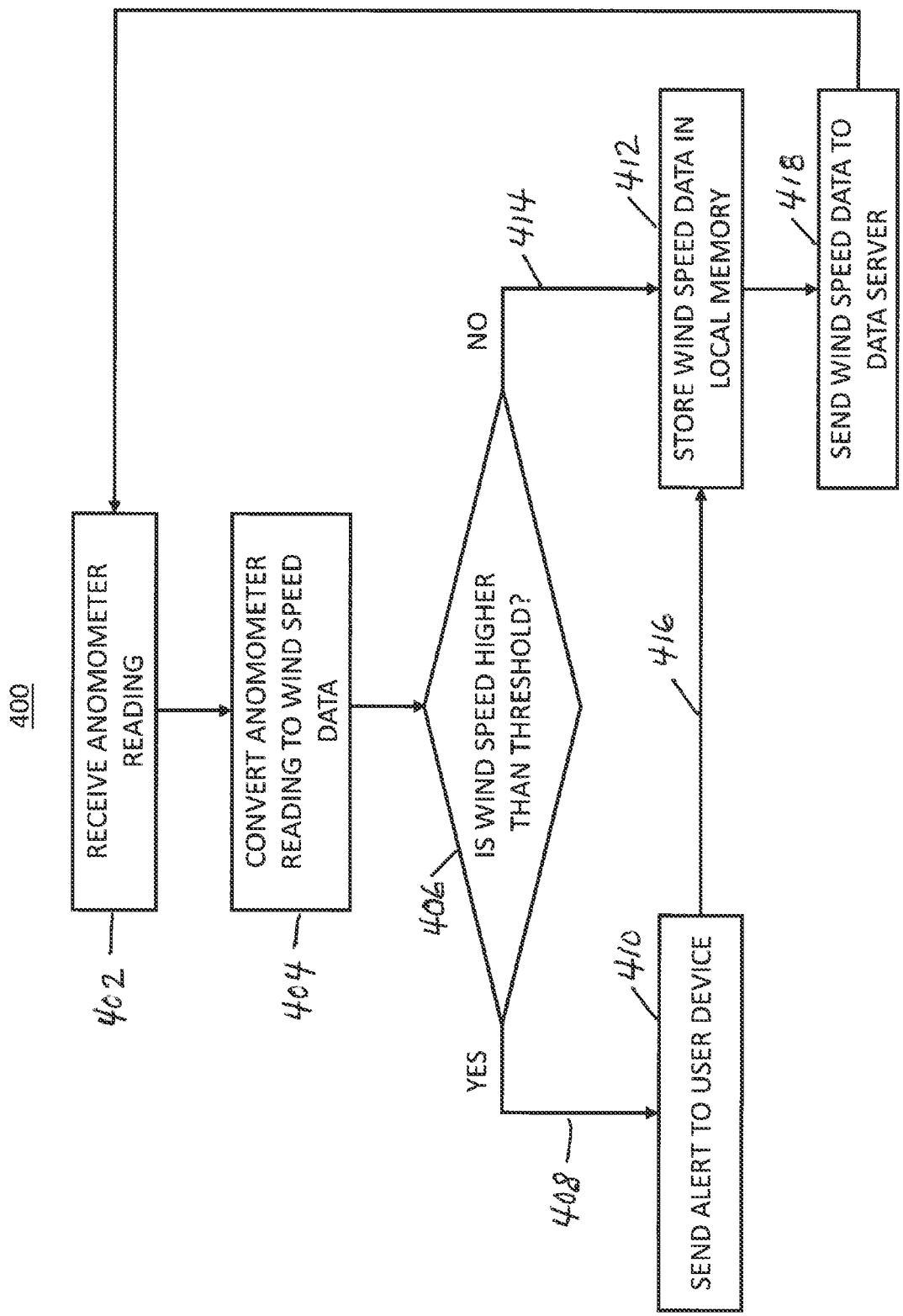
FIG. 4 shows an example of a process for managing wind speed data in accordance with some embodiments of the disclosed subject matter.

Referring now to FIG. 4, there is illustrated an example of a process 400 for managing wind speed data in accordance with some embodiments of the disclosed subject matter. In FIG. 4, the example process 400 is illustrated by means of a block diagram wherein each block represents a step or steps of the process. In some embodiments, additional blocks can be present in between and/or in series with and/or in parallel with the blocks illustrated and/or additional steps can be present between and/or in series with and/or in parallel with the steps described.

In some embodiments, the process 400 can be executed by any device or combination of devices. For example, the process 400 can be executed at least in part by one or more data servers (e.g. the data server 202 of FIG. 2), one or more user devices (e.g., the user device 204 of FIG. 2), one or more wind stations (e.g., the wind stations 209 of FIG. 2 and/or wind station system 100 of FIG. 1), one or more certification servers (e.g., the certification server 206 of FIG. 2) and/or any other suitable device.

The wind speed data managing process 400 can begin at block 402 having steps of receiving an anemometer reading. In some embodiments, receiving step 402 can receive an anemometer reading in any suitable format. For example, the step 402 can receive an electrical signal from the anemometer 104. As a more particular example, the electrical signal can be an AC sine wave. In such a more particular example, the frequency of the AC sine wave can be proportional to the wind speed. In some embodiments, the anemometer reading can be a continuous reading. In some other embodiments, the anemometer reading can be an instantaneous reading or a plurality of instantaneous readings.

In some embodiments, the process 400 can include a block 404 having steps wherein the anemometer reading is converted to wind speed data. In some embodiments, the steps of block 404 follow the steps of block 402. In some embodiments, the converting step 404 can convert the anemometer reading to wind speed data using any suitable technique or combination of techniques and any suitable information. For example, if the received anemometer reading is an AC sine wave with a frequency proportional to wind speed, the steps of block 404 can apply a predetermined multiplier to the frequency to calculate the wind speed.

In some embodiments, the process 400 can convert an anemometer reading (or a plurality of anemometer readings) over a predetermined period of time to an average wind speed. For example, the process 400 can receive (e.g., in block 402) an anemometer reading or readings over a thirty second period, a one minute period or any other suitable amount of time and convert (e.g., in block 404) the anemometer reading or readings over that period to an average wind speed. Thus, in some embodiments, the block 402 or 404 can further include steps of storing multiple anemometer readings received at intervals over a predetermined period of time. In some embodiments, the block 404 can further include steps of converting multiple anemometer readings into an average wind speed.

In some embodiments, the steps of block 404 can include steps of converting an anemometer reading over a first predetermined period of time to a maximum wind speed during a second, shorter, predetermined time period that is within the first predetermined period of time (referred to sometimes herein as a "peak gust"). For example, if the received anemometer reading in block 402 is an AC sine wave with a frequency proportional to wind speed, the block 404 can include determining the frequency of the wave over a ten-minute base period, and calculating a moving average of the frequency over each three-second period, and finding a maximum three-second average wind speed by applying a predetermined multiplier to the maximum three-second moving average frequency. In other embodiments, any values for the first predetermined time period (i.e., "the base period") and the second predetermined time period (i.e., "the moving average period") can be used.

In some embodiments, the process 400 can include a block 406 having steps of determining whether the wind speed data is higher than a predetermined threshold. In some embodiments, the block 406 follows block 404. For example, if the steps in block 404 convert the anemometer reading to a peak gust, the steps in block 406 can determine whether the peak gust exceeds a predetermined threshold peak gust. As another example, if the steps in block 404 convert the anemometer reading to an average wind speed, the steps in block 406 can determine whether the average wind speed exceeds a predetermined threshold wind speed.

In some embodiments of the process 400, in the event that the wind speed exceeds a predetermined threshold, the steps in block 406 can proceed (as denoted by arrow 408 in FIG. 4) to block 410 including steps of sending an alert to be sent to a user device 204. In some embodiments, steps of block 410 can cause an alert to be sent to a user device 204 using any technique or combination of techniques. For example, if the user device 204 is a mobile phone, the steps of block 410 can cause a text message to be sent to the user device. As another example, if the user device 204 is a personal computer, the steps of block 410 can send an alert via e-mail. As yet another example, the steps of block 410 can cause an alert to be posted to a Web site.

In some embodiments, the steps of block 410 can send an alert to a user device 204 using any suitable communication network. For example, the steps of block 410 can send an alert using the communication network 210 shown in FIG. 2 and described in connection with the computer hardware 200.

In some embodiments, the process 400 includes a block 412 having steps of storing wind speed in local memory. In some embodiments, the steps of block 412 can either follow the steps of block 406 directly (as denoted by arrow 414 in FIG. 4) or via the steps of block 410 (as denoted by arrows 408 and 416 in FIG. 4). In some embodiments, any suitable local memory can be used. For example, the steps of block 412 can store wind speed data in the local memory 130 of the storage device 118 as shown in FIG. 1 and described in connection with wind station system 100.

In some embodiments, the steps of block 412 can store wind speed data in local memory in any suitable format. For example, the steps of block 412 can store the wind speed data in an XML format, JSON format, CSV format, and/or any other suitable data format.

In some embodiments, the steps of block 412 can store any amount of wind speed data in local memory. For example, in some embodiments the steps of block 412 can store days, months, or years of wind speed data in local memory.

In some embodiments, the process 400 includes a block 418 having steps of sending wind speed data to a data server. In some embodiments, the steps of block 418 follow the steps of block 412. In some embodiments, the steps of block 412 can send wind speed data to a data server using any suitable communication network. For example, the steps of block 412 can send wind speed data to a data server 202 using the communication network 210 shown in FIG. 2 and described in connection with the hardware 200.

Figure 5:
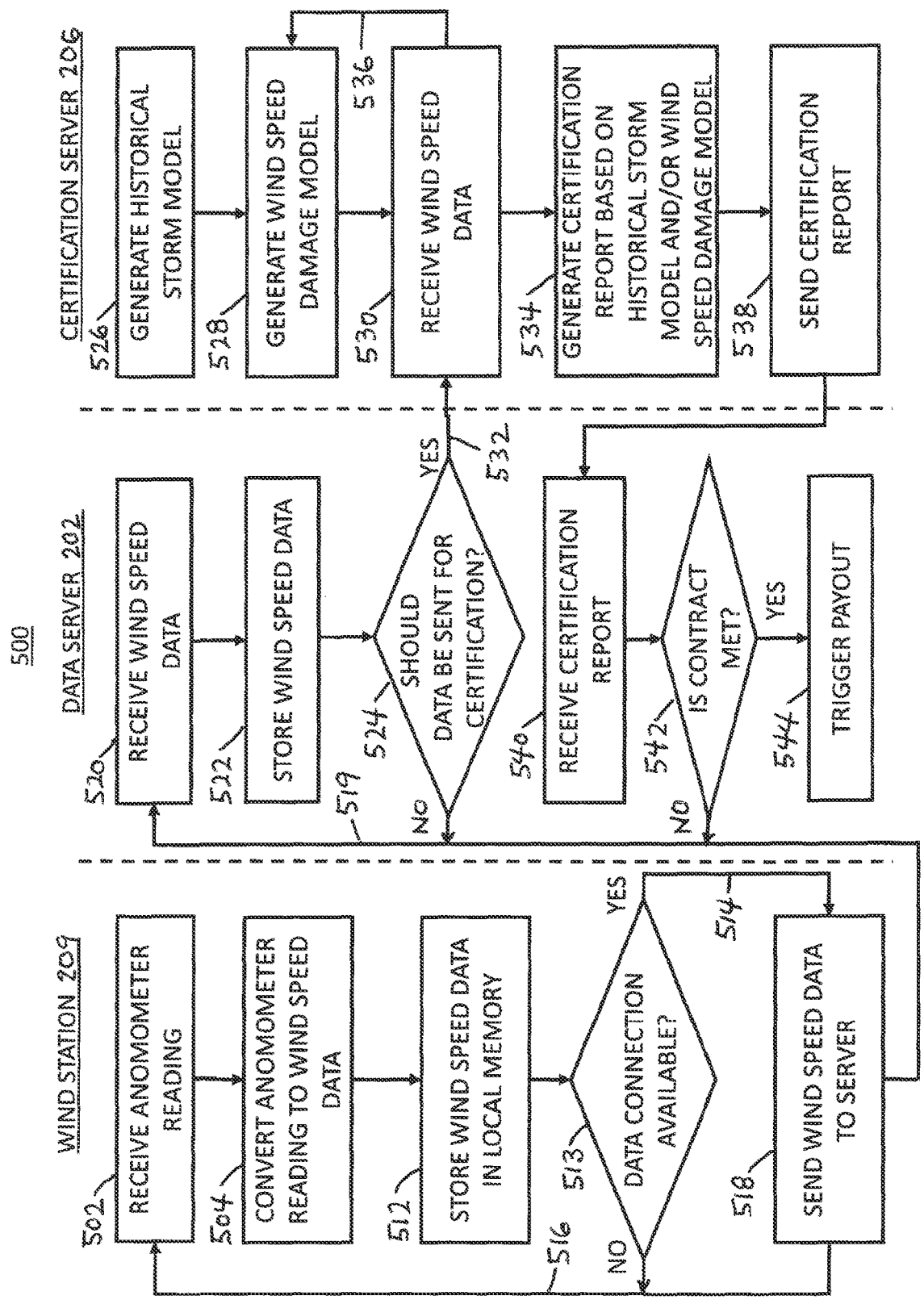
FIG. 5 shows an example of a process for managing wind speed data including triggering wind speed payouts based on wind speed data in accordance with some embodiments of the disclosed subject matter.

Referring now to FIG. 5, there is illustrated an example of a process 500 for triggering wind speed payouts based on wind speed data in accordance with some embodiments of the disclosed subject matter. In FIG. 5, the example process 500 is illustrated by means of a block diagram wherein each block represents a step or steps of the process. In some embodiments, additional blocks can be present in between and/or in series with and/or in parallel with the blocks illustrated and/or additional steps can be present between and/or in series with and/or in parallel with the steps described.

In some embodiments, the triggering process 500 can be executed by any device or combination of devices. For example, the process 500 can be executed at least in part by one or more data servers (e.g. the data server 202 of FIG. 2), one or more user devices (e.g., the user device 204 of FIG. 2), one or more wind stations (e.g., the wind station 209 of FIG. 2 and/or wind station system 100 of FIG. 1), one or more certification servers (e.g., the certification server 206 of FIG. 2), and/or any other suitable device.

In some embodiments, the trigging process 500 can begin at a block 502 having steps of receiving an anemometer reading at a wind meter. In some embodiments, the steps of block 502 can receive an anemometer reading using any suitable techniques or combination of techniques. For example, the steps of block 502 can receive an anemometer reading as described above for block 402 with reference to FIG. 4.

In some embodiments, the triggering process 500 includes a block 504 having steps of converting an anemometer reading into wind speed data. In some embodiments, the steps of block 504 follow the steps of block 502. In some embodiments, the steps of block 504 can convert an anemometer reading into wind speed data using any suitable techniques or combination of techniques and any suitable information. For example, the steps of block 504 can convert an anemometer reading into wind speed data as described above for block 404 with reference to FIG. 4.

In some embodiments, the triggering process 500 includes a block 512 having steps of storing wind speed data in a local memory of a wind station. In some embodiments, the steps of block 512 follow the steps of block 504. In some embodiments, the steps of block 512 can store wind speed data in a local memory of a wind station using any suitable techniques or combination of techniques. For example, the steps of block 512 can store wind speed data in the local memory of a wind station 209 as described above for block 412 with reference to FIG. 4, or in the local memory 130 of a storage device 118 of a wind station system 100 as described above with reference to FIG. 1.

In some embodiments, the triggering process 500 includes a block 513 having steps of determining whether a data connection is available. In some embodiments, the steps of block 513 can follow the steps of block 512. The steps of block 513 can determine whether a data connection is available using any suitable techniques or combination of techniques and any suitable information. For example, the steps of block 513 can determine whether a data connection is available by pinging a server, sending a test data packet, querying a server and/or any other suitable technique or combination of techniques.

If the steps of block 513 determine that a data connection is available, the process 500 can continue to block 518 (as denoted by arrow 514 in FIG. 5) having steps of sending wind speed data to a server. In some embodiments, the steps of block 518 can send wind speed data to a server using any suitable techniques or combination of techniques. For example, the steps of block 518 can send wind speed data to a server (e.g., the data server 202 and/or certification server 206 of FIG. 2) as described above for block 418 with reference to FIG. 4. If the steps of block 513 determine that a data connection is not available, the process 500 can continue by repeating an earlier part of the process (e.g., as denoted by arrow 516 in FIG. 5).

In some embodiments, the triggering process 500 includes a block 520 having steps of receiving wind speed data at a data server (e.g., the data server 202 of FIG. 2). In some embodiments, the steps of block 520 follow the steps of block 518 (as denoted by arrow 519 in FIG. 5). In some embodiments, the steps of block 520 can receive wind speed data using any suitable techniques or combination of techniques. For example, the steps of block 520 can receive the wind speed data via a communication network (e.g., the communication network 210 of FIG. 2).

In some embodiments, the triggering process 500 includes a block 522 having steps of storing wind speed data. In some embodiments, the steps of block 522 follow the steps of block 520. In some embodiments, the steps of block 522 can store wind speed data using any suitable techniques or combination of techniques. For example, the steps of block 522 can store wind speed data on a memory and/or storage (e.g., the memory and/or storage 304 of F 1-G 3).

In some embodiments, the triggering process 500 includes a block 524 having steps of determining whether wind speed data should be sent for certification. In some embodiments, the steps of block 524 can follow the steps of block 522. In some embodiments, the steps of block 524 can determine whether wind speed data should be sent for certification using any suitable techniques or combination of techniques and any suitable information. For example, the steps of block 524 can determine whether wind speed data should be sent for certification based on whether the wind speed data is related to a named storm (e.g., a named hurricane or typhoon). As a more particular example, if the wind speed data is gathered from a location and time period associated with a storm that has been named by a weather organization (e.g., the National Weather Service), the steps of block 524 can determine that the wind speed data should be sent for certification. As another example, the steps of block 524 can determine whether wind speed data should be sent for certification based on a threshold wind speed. As a more particular example, if the wind speed data includes a wind speed that is higher than a predetermined threshold wind speed, the steps of block 524 can determine that the wind speed data should be sent for certification. If the steps of block 524 determine that the wind speed data does not need to be certified, the process 500 can continue by repeating an earlier part of the process (e.g., as denoted by arrow 519 in FIG. 5).

In some embodiments, the triggering process 500 includes a block 526 having steps of generating a historical storm model. In some embodiments, the steps of block 526 can generate a historical storm model using any suitable technique or combination of techniques and any suitable information.

In some embodiments, the steps of block 526 can generate a historical storm model using any suitable historical storm data. For example, the steps of block 526 can use data cataloging the frequency and severity of storms along the United States coastline over a certain period. As a more particular example, the steps of block 526 can use a storm dataset that records the time, date, latitude, longitude, maximum sustained wind speed, and central pressure for storms from the year 1900 through 2012. In other embodiments, the steps of block 526 can use a storm dataset for storms from the year 1900 through the most recent year for which storm data is available. In still other embodiments, the steps of block 526 can use a storm dataset for storms from a predetermined first year agreed-to under a contract through a predetermined final year agreed-to under the contract.

In some embodiments, the steps of block 526 can further include supplementing historical storm data by generating synthetic storms and/or generating a historical storm model based at least in part on the synthetic storms. For example, the process 500 and/or the steps of block 526 can generate synthetic storms by utilizing the bogusing technique of Kurihara et al., "An Initialization Scheme of Hurricane Models by Vortex Specification," Monthly Weather Review, vol. 2, July 1993, the content of which is incorporated herein by reference.

In some embodiments, the triggering process 500 includes a block 528 having steps of generating a wind speed damage model based on a historical storm model. In some embodiments, the steps of block 528 can follow the steps of block 526, and the historical storm model can be the historical storm model generated by the steps of block 526. In some embodiments, the steps of block 528 can generate a wind speed damage model based on the historical storm model using any suitable techniques or combination of techniques and any suitable information.

In some embodiments, the steps of block 528 can generate a wind speed damage model by simulating wind gusts based on the historical storm model. For example, the steps of block 528 can simulate peak gusts in the historical storm model and associate the simulated peak gusts with historical damage information.

In some embodiments, the triggering process 500 includes a block 530 having steps of receiving wind speed data if the process determines (e.g., from the steps of block 524) that that wind speed data should be sent for certification i.e., as denoted by arrow 532 in FIG. 5). In some embodiments, the steps of block 530 can receive wind speed data using any suitable technique or combination of techniques. For example, the steps of block 530 can receive wind speed data via a communication network (e.g., the communication network 210 of FIG. 2) from a wind station, such as wind station system 100, as described above. As another example, the steps of block 530 can receive wind speed data via a communication network (e.g., the communication network 210 of FIG. 2) from a data server (e.g., the data server 202 of FIG. 2).

In some embodiments, the triggering process 500 includes a block 534 having steps of generating a certification report for the received wind speed data based on the historical storm model, and/or the wind speed damage model. In some embodiments, the steps of block 534 can follow the steps of block 530. In some embodiments, the steps of block 534 can generate a certification report for the received wind speed data based on the historical storm model (e.g., from block 526) and/or the wind speed damage model (e.g., from block 528) using any suitable technique or combination of techniques and any additional suitable information. For example, in some embodiments, the process 500 and the steps of block 534 can generate a certification report by inputting (as denoted by arrow 536 in FIG. 5) the received wind speed data in addition to information related to buildings in an area related to the wind speed data (e.g., construction class of the buildings, building height, building occupancy, year of construction, and/or floor area) into the wind speed damage model. As a more particular example, if the wind speed data is within a predetermined number of standard deviations from a wind speed predicted by the model, the steps of block 534 can generate a certification report that certifies the wind speed data. As another example, the steps of block 534 can generate a certification report by comparing the received wind speed data (e.g., from block 530) with a wind speed predicted by the historical storm model (e.g., from block 526). As yet another example, the steps of block 534 can generate a certification report based on wind speed data received from a third party.

In some embodiments, the triggering process 500 includes a block 538 having steps of sending the certification report. In some embodiments, the steps of block 538 can follow the steps of block 534. In some embodiments, the steps of block 538 can send the certification report using any suitable techniques or combination of techniques. For example, the steps of block 538 can send the certification report to a data server (e.g., the data server 202 of FIG. 2) via a communication network (e.g., the communication network 210 of FIG. 2). The triggering process 500 may further include a block 540 having steps of receiving the certification report sent by the steps of block 538. In some embodiments, the steps of block 540 can receive the certification report using any suitable techniques or combination of techniques. For example, the steps of block 540 can receive the certification report from a communication network (e.g., the communication network 210 of FIG. 2) using a data server (e.g., the data server 202 of FIG. 2).

In some embodiments, the triggering process 500 includes a block 542 having steps of determining if a contract has been met. In some embodiments, the steps of block 542 can follow the steps of block 540. In some embodiments, the steps of block 542 can determine if a contract has been met using any suitable techniques or combination of techniques and/or any suitable information. For example, the steps of block 542 can determine if a contract has been met based on the received certification report, e.g., the certification report received from block 540. For example, the steps of block 542 can determine that a wind speed contained in wind speed data is greater than a threshold amount contained in a contract and that the certification report certifies that such a wind speed is correct, and accordingly determine that the contract has been met. As another example, the steps of block 542 can determine that a wind speed contained in wind speed data is greater than a threshold amount contained in a contract, and that the certification report does not certify that such a wind speed is correct, and accordingly determine that the contract has not been met.

In some embodiments, the steps of block 542 can determine if a contract has been met by submitting the wind speed data and certification report for manual review. For example, if the steps of block 542 determine that wind speed data includes a wind speed that is higher than a threshold wind speed contained in a contract, and that the certification report certifies that the wind speed data is correct, the steps of block 542 can then submit the wind speed data and the certification report for manual review.

In some embodiments, the triggering process 500 includes a block 544 having the steps of triggering a payout of a contract. In some embodiments, the steps of block 544 can follow the steps of block 542 if the steps of block 542 determined that the contract was met. In some embodiments, the steps of block 542 can trigger a payout of the contract using any suitable technique or combination of techniques. For example, the steps of block 542 can trigger a payout of the contract by sending information to a contract payout server (e.g., the contract payout server 208 of FIG. 2). As another example, the steps of block 542 can trigger a payout by processing an electronic transaction such as a bank deposit, an electronic funds transfer, a direct deposit, sending a digital currency and/or any other suitable electronic transaction.

In some embodiments, at least some of the above-described blocks and/or steps of the processes of FIGS. 4 and 5 can be executed or performed in any order or sequence not limited to the order and sequence shown in and described in connection with the figures. Also, some of the above blocks and/or steps of FIGS. 4 and 5 can be executed or performed substantially simultaneously where appropriate or in parallel to reduce latency and processing times. Additionally or alternatively, some of the above described blocks and/or steps of the processes of FIGS. 4 and 5 can be omitted.

In some embodiments, any suitable computer readable media can be used for storing instructions for performing the functions and/or processes herein. For example, in some embodiments, computer readable media can be transitory or non-transitory. For example, nontransitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In accordance with additional aspects and embodiments of the disclosed subject matter, mechanisms (which can include methods, systems, and media) for managing seismic data are described herein.

Figure 6:
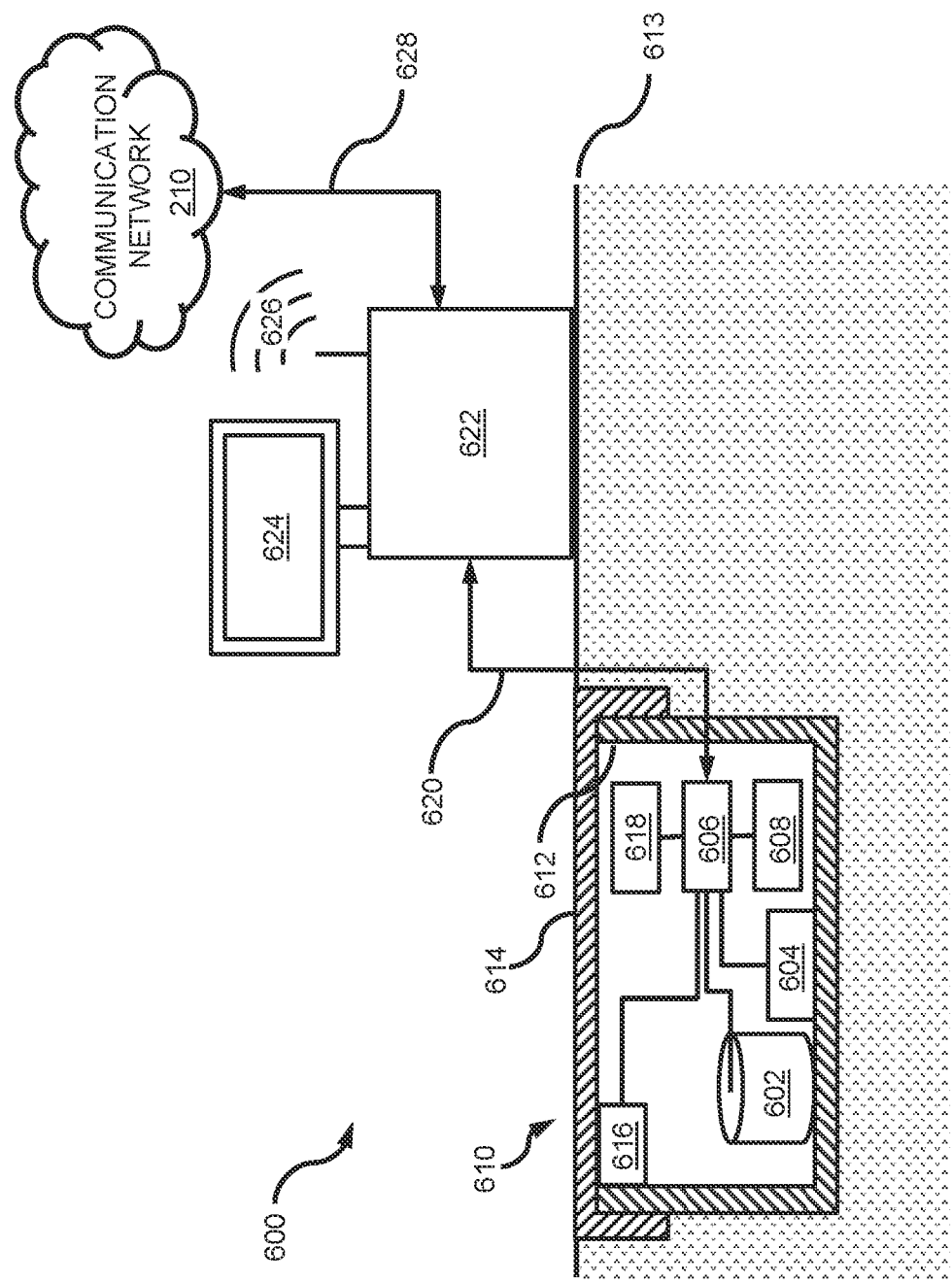
FIG. 6 shows an example of a seismic station system for managing seismic data in accordance with another aspect of the disclosed subject matter.

Referring now FIG. 6, there is illustrated an example of a seismic station system 600 for managing seismic data in accordance with some embodiments of the disclosed subject matter. In some embodiments, the seismic station system 600 is disposed at a geographic location of interest and manages seismic data for earthquakes and other seismic events occurring at that geographic location. In some embodiments, a particular seismic station system 600 can manage seismic data for its own geographic location (also known as "local seismic data") and can also receive seismic signals relevant to other seismic stations, i.e., at different geographic locations (also known as "remote seismic stations"), and produce seismic data for the remote seismic signals (also known as "remote seismic data"). The remote seismic data can be managed by the particular seismic station system 600 for quality control purposes and/or to certify the seismic data received from the remote seismic stations. As shown, in some embodiments, the seismic system 600 can include a seismometer 602, an accelerometer 604, a data processor 606 and a memory 608. Some embodiments of system 600 can include only one or more seismometers 602, other embodiment can include only one or more accelerometers 604, and still other embodiments can include both seismometer(s) and accelerometer(s). Seismic waves (also known as seismic readings) at the geographic location are detected by the seismometer 602, converted into electrical signals and sent to the data processor 606. Ground accelerations (also known as acceleration readings) at the geographic location are detected by the accelerometer 604, converted into electrical signals and sent to the data processor 606. In various embodiments, the accelerometer 604 can be a single axis accelerometer or a multi-axis accelerometer, and in particular, it can be a three-axis accelerometer for detecting axial accelerations along three separate axes or a six-axis accelerometer for detecting both axial and rotational accelerations along three separate axes. In various embodiments, the accelerometer 604 can be a piezoelectric accelerometer, a piezoresistive accelerometer or a capacitive accelerometer. In some embodiments, the accelerometer 604 can be a micro electro-mechanical systems ("MEMS") device of the type having a cantilever beam with a proof mass (also known as seismic mass). In other embodiments, the accelerometer 604 can be a MEMS thermal type using a heated fluid inside a dome to produce a thermal bubble that acts as the proof mass.

The data processor 606 receives the electrical signals from the seismometer 602 and accelerometer 604 and converts the signals into seismic data that can be recorded in the memory 608. In some embodiments of the system 600, the seismic data can be digital data and the memory 608 can be a digital data storage device including, but not limited to, a hard disk drive ("HDD") or a solid state drive ("SSD"). In other embodiments of the system 600, the seismic data can be digital data and the memory 608 can be digital data storage media including, but not limited to, a solid-state non-volatile memory device, a flash memory card, a Secure Digital card or a Compact Flash card. In still other embodiments of the system 600, the seismic data can be analog data and the memory 608 can be an analog data storage device or analog data storage media.

Referring still to FIG. 6, in some embodiments of the system 600, one or more of the seismometer 602, accelerometer 604, data processor 606 and memory 608 can be disposed inside a secure housing 610 disposed at the selected geographic location of interest. In the illustrated embodiment, the secure housing 610 includes a main housing 612 disposed at or below grade level 613 and a housing lid or door 614 that can enclose the relevant system components within the main housing. In other embodiments, the housing 610 may be disposed above grade, e.g., attached to a foundation, wall or other structural member of a building. The main housing 612 and the housing lid 614 can be formed of damage-resistant materials such as concrete or steel to protect the system components during an earthquake or during a structure collapse or fire that may accompany or follow the quake.

To prevent or detect tampering with the system 600, the housing 610 can further be equipped with a security device 616 that can lock the housing and/or can detect opening of the housing lid 614. The security device 616 can send electrical signals to the data processor 606 to indicate opening of the housing lid 614, and the data processor can convert the signals from the security device into security data that can be sent to the memory 608 for storage.

The system 600 can further include a battery 618 to provide electrical power for operation of the seismometer 602, accelerometer 604, data processor 606 and/or memory 608. In some embodiments, the battery 618 can be disposed within the housing 610 to provide power to the internal system components in case external connections 620 to the housing are cut or disabled. For example, if a first small earthquake event occurs that cuts off external power (e.g., mains power) to the system 600, the battery 618 can continue to power the measuring instruments 602 and 604, processor 606 and memory 608 such that a subsequent larger earthquake event occurring while the mains power is out can be detected and recorded.

The seismic system 600 can further include a computing device 622 operably connected to the data processor 606 and memory 608. In the illustrated embodiment, the computing device 622 is located externally to the housing 610 and connected to equipment within the housing via connection 620, which can include electrical or fiber optic data cables and/or electrical power cables. In other embodiments, the computing device 622 can be located inside the housing 610. In some embodiments, the connection 620 can comprise a wireless data communication link including, but not limited to, WiFi (i.e., IEEE 802.11 series), Bluetooth (i.e., IEEE 802.15 series and Bluetooth SIG series) or other local area wireless technology. The computing device 622 can include a display device 624 to display information regarding detected seismic events, the status of the system and system components, messages from the other elements of the system, etc. In the illustrated embodiment, the computing device 622 is separate from the data processor 606 and the memory 608; however, in some other embodiments, the data processor and/or the memory may be components of the computing device 622. In still other embodiments, the computing device 622 can comprise a secondary or redundant data processor to augment or "back up" the primary data processor 606 and/or a secondary or redundant memory to augment or "back up" the primary data memory 608.

The computing device 622 can communicate with a communication network 210, for example, either the same network or a network similar to that described in connection with the wind station system 100 of FIGS. 1 and 2. The communication network 210 can be any suitable combination of one or more wired and/or wireless networks in some embodiments. For example, the communication network 210 can include anyone or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. The computing device 622 can be connected to the communication network 210 by one or more wireless communication links 626 and/or one or more hard wired communication links 628.

Referring now again to FIG. 3, the computer hardware 300 illustrated in connection with the computing device 108 of the wind station system 100 or wind station 209 can similarly be implemented as the computing device 622 of the seismic station system 600. The various components and operations of the computer hardware 300 described in connection with computing device 108 can be applied in analogous fashion to the computing device 622, and therefore will not be repeated.

Figure 7:
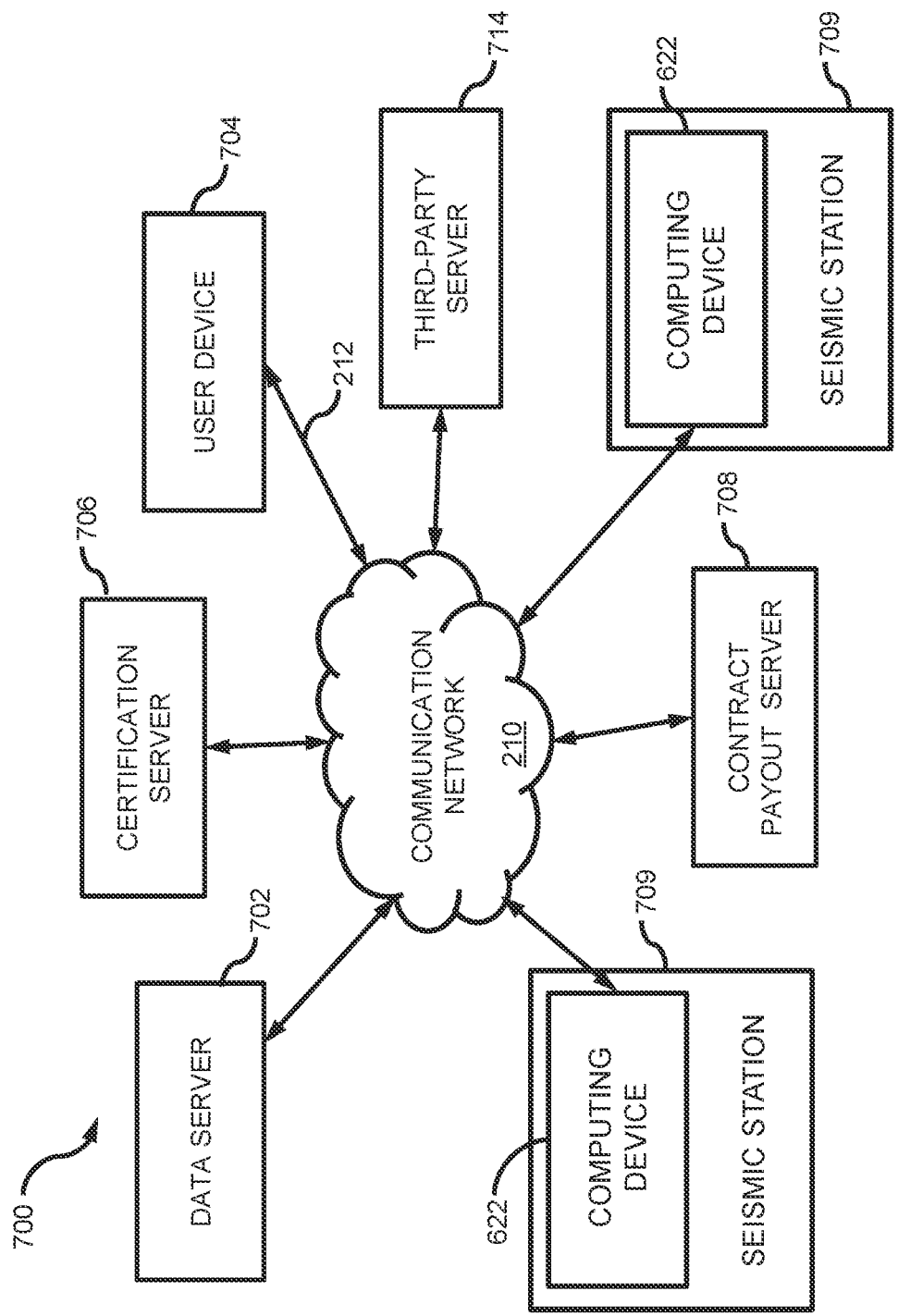
FIG. 7 shows an example of hardware for managing seismic data that can be used in accordance with some embodiments of the disclosed subject matter.

Referring now to FIG. 7, there is illustrated one example of system hardware 700 for managing seismic data that can be used in accordance with some embodiments of the disclosed subject matter. As illustrated, the system hardware 700 can include one or more: data servers 702, user devices 704, certification servers 706, contract payout servers 708 and seismic stations 709 outfitted with computing devices 622.

In some embodiments, the seismic station 709 can be any suitable seismic station configured with a computing device 622. For example, as shown in FIG. 6, the seismic station 709 can be the seismic station system 600 disposed at a particular geographic location.

In some embodiments, the data server 702 can be any suitable server for storing data and/or delivering the data to a user device 704. In some embodiments, the data stored by the data server 702 and/or delivered to the user device 704 can be implemented as digital data in any digital data format. For example, the data server 702 can be a server that delivers data to a user device 704 and/or receives seismic data from a seismic station 709 via a communication network 210. In some embodiments, the data server 702 can include a server computing device, a server communication interface operatively connected to the communication network 210 to receive respective seismic data from one or more seismic stations 709 and operatively connected to the server computing device to provide the received respective seismic data to the server computing device and a server memory disposed at the respective data server location and operatively connected to the server computing device for storing the received respective seismic data. Data stored and/or delivered by the data server 702 can be any suitable data, such as seismic wave data relating to amplitude, frequency, direction, occurrence time or duration of seismic wave readings at the geographic location of interest, seismic magnitude or intensity readings at the geographical location of interest (e.g., derived by the data processor 606 from the seismic readings or data), acceleration data relating to amplitude, frequency, direction, occurrence time or duration of ground acceleration at the geographic location of interest, ground velocity data relating to amplitude, frequency, direction, occurrence time or duration at the geographic location of interest (e.g., derived by the data processor 606 from the acceleration readings), historical seismic event data, contract data, contract payout data and/or any other suitable data. Data can be recorded and uploaded to the data server 702 by any suitable entity (e.g., a seismic station computing device 622). In some embodiments, the data server 702 can be disposed at a geographic location that is remote from (i.e., geographically distant from) the seismic station system 600, whereas in other embodiments, the data server can be disposed at the same geographic location as the seismic station system. In some embodiments having more than one seismic station system 600, each respective seismic station system can be disposed at a different respective seismic station location, and the data server 702 can be disposed at a data server location that is remote from at least one of the respective seismic station locations. In some embodiments having more than one seismic station system 600 and more than one data server 702, each respective seismic station system can be disposed at a different respective seismic station location, and each respective data server can be disposed at a different respective data server location, wherein the respective seismic station locations and data server locations are all geographically remote from one another. In some other embodiments, the data server 702 can be omitted.

As previously described, the communication network 210 can be any suitable combination of one or more wired and/or wireless networks in some embodiments. For example, the communication network 210 can include anyone or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. The user device 704 can be connected by one or more communications links 212 to the communication network 210, which can be linked via one or more communications links to the data server 702, and/or seismic stations 709. The communications links 212 can be any communications links suitable for communicating data among the user device 704, data server 702 and seismic stations 709, such as network links, dial-up links, wireless links, hardwired links, any other suitable communications links, or any suitable combination of such links. In some embodiments, the data communicated across the communication network 210 and/or communication links 212 can be implemented as digital data in any digital data format.

The user device 704 can include any one or more user devices suitable for requesting data, searching for data, viewing data, retransmitting data, manipulating data, receiving a user input and/or any other suitable functions. For example, in some embodiments, the user device 704 can be implemented as a mobile device, such as a mobile phone, a tablet computer, a laptop computer and/or any other suitable mobile device. As another example, in some embodiments, the user device 704 can be implemented as a non-mobile device such as a desktop computer and/or any other suitable non-mobile device. In some embodiments, the user device 704 can be disposed at a geographic location that is remote from (i.e., geographically distant from) the seismic station system 600 and/or the data server 702, whereas in other embodiments, the user device can be disposed at the same geographic location as the seismic station system and/or the data server.

In some embodiments, the contract payout server 708 can be any suitable server for causing a contract to be paid out based on seismic data. For example, the contract payout server 708 can be a server that receives seismic data from a data server 702 via a communication network 210, and/or determines whether a contract should be paid out based on seismic data and/or causes a third party server 714 to payout a contract by communicating with the third party server over a communication network 210. The storage of the seismic data and other information, programs, data and/or other suitable information on the contract payout server 708 can be implemented as digital data in any digital data format. In some embodiments, the contract payout server 708 can be implemented by hardware analogous to that previously described in connection with FIG. 3. In some embodiments, the payout server 708 can include a payout server computing device or hardware processor 302, a payout server communication interface 316 operatively connected to the communication network 210 to receive respective certification reports from one or more certification servers 706 and operatively connected via a data bus 318 to the payout server computing device to provide the received respective certification reports to the payout server computing device, and/or a payout server memory 304 operatively connected via the data bus to the payout server computing device for storing the received respective certification reports. In some embodiments, the payout server computing device 302 can determine if a received respective certification report satisfied the terms of an associated contract, and if so, the payout server can trigger a payout at another location by communicating over the communication network 210. In some embodiments, the contract payout server 708 can be disposed at a geographic location that is remote from (i.e., geographically distant from) the seismic station system 600, the data server 702 and/or the user device 704, whereas in other embodiments, the contract payout server can be disposed at the same geographic location as the seismic station system, the data server and/or the user device.

In some embodiments, the certification server 706 can be any suitable server for certifying seismic data. For example, the certification server 706 can be a server that receives seismic data from a data server 702 via a communication network 210, and/or stores historical seismic data and/or determines whether seismic data is accurate. The storage of the seismic data and other information, programs, data and/or other suitable information on the certification server 706 can be implemented as digital data in any digital data format. In some embodiments, the certification server 706 can be implemented by hardware analogous to that previously described in connection with FIG. 3. In some embodiments, the certification server 706 can include a certification server computing device or hardware processor 302, a certification server communication interface 316 operatively connected to the communication network 210 to receive respective seismic data from one or more data servers 702 and operatively connected via a data bus 318 to the certification server computing device to provide the received respective seismic data to the certification server computing device, and/or a certification server memory 304 operatively connected via the data bus to the certification server computing device for storing the received respective seismic data. In some embodiments, the certification server computing device 302 can generate a data model, for example a historical earthquake/seismic event model or a earthquake/seismic event damage model, and the generated data model can be transmitted by the certification server communication interface 314 to another location on the communication network 210. In some embodiments, the certification server computing device 302 can generate a certification report based on the received seismic data and the generated data model, and the certification report can be transmitted by the certification server communication interface 314 to another location on the communication network 210. In some embodiments, the certification server 706 can be disposed at a geographic location that is remote from (i.e., geographically distant from) the seismic station system 600, the data server 702, the user device 704 and/or the contract payout server 708, whereas in other embodiments, the contract payout server can be disposed at the same geographic location as the seismic station system, the data server, the user device and/or the contract payout server.

Although the data server 702 and the user device 704 are illustrated as separate devices in FIG. 7, the functions performed by the data server and the user device can be performed using any suitable number of devices in some embodiments. For example, in some embodiments, the functions performed by either the data server 702 or the user device 704 can be performed on a single device. As another example, in some embodiments, multiple devices can be used to implement the functions performed by the data server 702 and the user device 704.

Although the data server 702, certification server 706, and the contract payout server 708 are illustrated as separate devices in FIG. 7, the functions performed by the data server, certification server and the contract payout server can be performed using any suitable number of devices in some embodiments. For example, in some embodiments, the functions performed by either the data server 702, the certification server 706, or the contract payout server 708 can be performed on a single device. As another example, in some embodiments, multiple devices can be used to implement the functions performed by the data server 702, the certification server 706 and the contract payout server 708.

Although only two seismic stations 709, one certification server 706, one contract payout server 708, one data server 702, one user device 704 and one third-party server 714 are shown in FIG. 7 to avoid over-complicating the figure, any suitable number and/or any suitable types of seismic stations, data servers, user devices and third-party servers can be used in some embodiments.

The data server 702, the user device 704, and the seismic station computing devices 622 can be implemented using any suitable hardware in some embodiments. For example, in some embodiments, the data server 702, the user device 704 and the seismic station computing devices 622 can be implemented using any suitable general purpose computer or special purpose computer. For example, the seismic station computing device 622 may be implemented using a general purpose computer or a special purpose computer. Any such general purpose computer or special purpose computer can include any suitable hardware. For example, referring again to FIG. 3, as illustrated in example computer hardware 300, such hardware can include a hardware processor 302, a memory and/or storage 304, an input device controller 306, an input device 308, display/audio drivers 310, display and audio output circuitry 312, a communication interface(s) 314, an antenna 316 and a bus 318.

Figure 8:
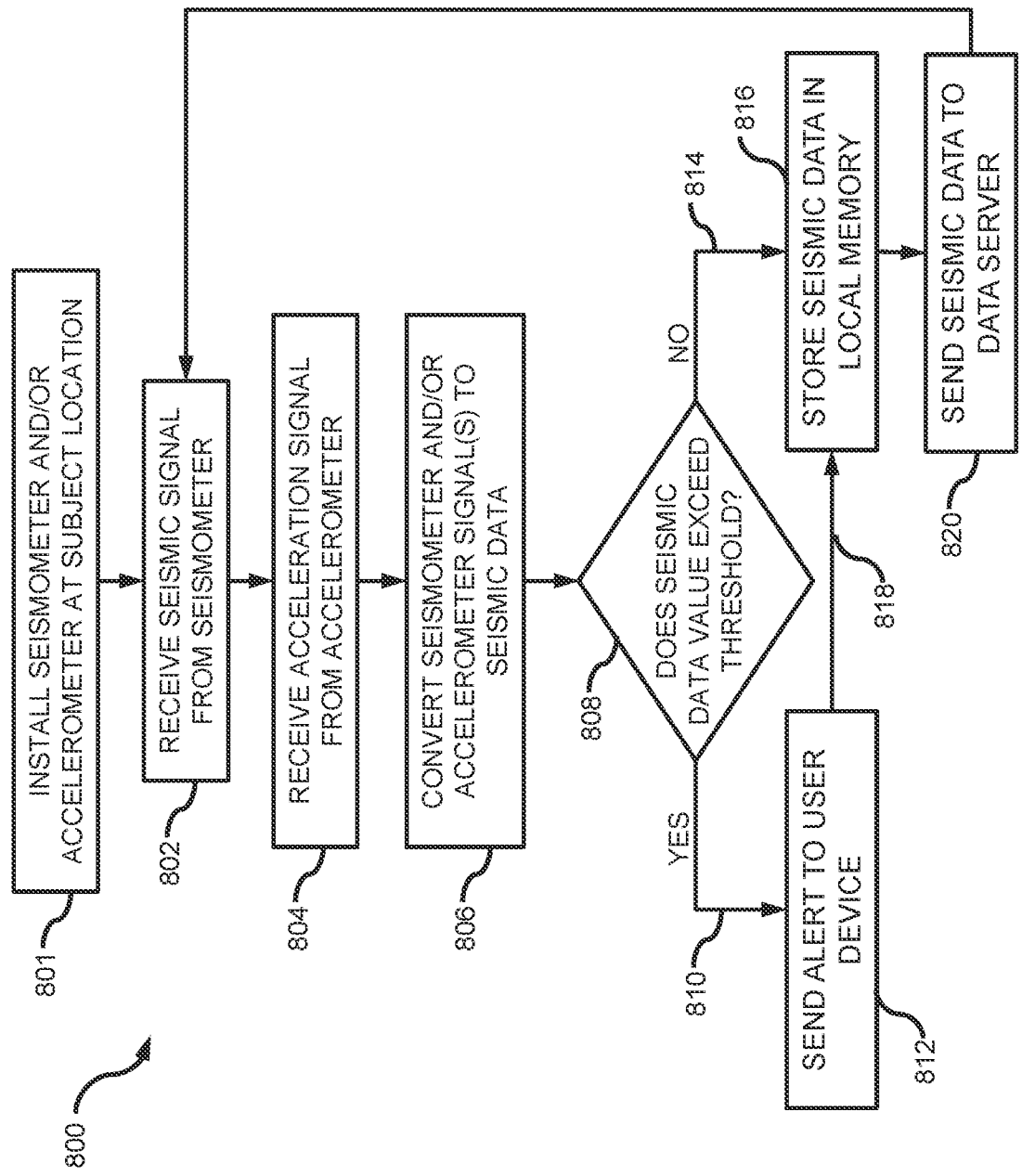
FIG. 8 shows an example of a process for managing seismic data in accordance with some embodiments of the disclosed subject matter.

Referring now to FIG. 8, there is illustrated an example of a process 800 for managing seismic data in accordance with some further embodiments of the disclosed subject matter. In FIG. 8, the example process 800 is illustrated by means of a block diagram wherein each block represents a step or steps of the process. In some embodiments, additional blocks can be present in between and/or in series with and/or in parallel with the blocks illustrated and/or additional steps can be present between and/or in series with and/or in parallel with the steps described.

In some embodiments, the process 800 can be executed by any device or combination of devices. For example, the process 800 can be executed at least in part by one or more data servers (e.g. the data server 702 of FIG. 7), one or more user devices (e.g., the user device 704 of FIG. 7), one or more seismic stations (e.g., the seismic stations 709 of FIG. 7 and/or seismic station system 600 of FIG. 6), one or more certification servers (e.g., the certification server 706 of FIG. 7) and/or any other suitable device.

The seismic data managing process 800 can begin at block 801 having steps wherein a seismic station 709 having a seismometer and/or accelerometer is installed at the geographic location of interest. This step allows the process 800 to utilize seismic data obtained directly at the geographic location of interest rather than relying only on isoseismal maps or estimates based on seismic measurements at other geographic locations. The block 801 can further have steps wherein the seismic station 709 is connected to the communication network 210 to send seismic data or other communications to various servers 702, 706, 708 and 714, devices 704 and other seismic stations 709 connected to the network. When multiple seismic stations 709 are connected together via the communication network 210, the process 800 can utilize seismic data received from seismic stations at other geographic locations (i.e., remote from the location of interest) to augment and supplement seismic data obtained from the seismic station directly at the geographic location of interest. For example, remote seismic data received from another seismic station 709 at a remote geographic location can be used, in whole or in part, to determine if recorded seismic data from a first seismic station at the location of interest is accurate, e.g., as steps of a data certification process.

In some embodiments, the process 800 can include block 802 having steps of receiving a seismic signal from a seismometer. In some embodiments, receiving step 802 can receive a seismic signal in any suitable format. For example, the step 802 can receive an electrical signal from the seismometer 602 at the seismic station 709. The electrical signal received from the seismometer 602 can be an analog signal or a digital signal. In some embodiments, the seismic signals can correspond to seismic P-waves, S-waves, and/or the frequency and/or the magnitude of such seismic waves detected by the seismometer 602. In some embodiments, the seismometer signal can be a continuous reading. In some other embodiments, the seismometer signal can be an instantaneous reading or a plurality of instantaneous readings.

In some embodiments, the process 800 can include block 804 having steps of receiving an acceleration signal from an accelerometer. In some embodiments, receiving step 804 can receive an acceleration signal in any suitable format. For example, the step 804 can receive an electrical signal from the accelerometer 604 at the seismic station 709. The electrical signal received from the accelerometer 604 can be an analog signal or a digital signal. In some embodiments, the acceleration signal received from the accelerometer 604 can correspond to axial and/or rotational accelerations around one or more axes, and/or the frequency and/or the magnitude of such accelerations. In other embodiments, the acceleration signals received from the accelerometer 604 can correspond to axial and/or rotational accelerations of the ground or a structure at the geographic location of interest, and/or the frequency and/or the magnitude of such accelerations. In some embodiments, the acceleration signal can be a continuous reading. In some other embodiments, the acceleration signal can be an instantaneous reading or a plurality of instantaneous readings.

In some embodiments of the process 800, the steps of block 802 are absent and only the steps of block 804 are present. In other embodiments of the process 800, the steps of block 804 are absent and only the steps of block 802 are present. In still other embodiments of the process 800, the steps of both block 802 and 804 are present. When the steps of both blocks 802 and 804 are present, the steps of block 802 can be performed before the steps of block 804, the steps of block 804 can be performed before the steps of block 802, or the steps can be performed simultaneously.

In some embodiments, the process 800 can include a block 806 having steps wherein the received seismic signal and/or the received acceleration signal are converted to seismic data. In the illustrated embodiment, the steps of block 806 follow the steps of both blocks 802 and 804. In other embodiments, the steps of block 806 can be divided into analogous blocks 806' and 806", wherein the steps of block 806' (converting seismic signals to first seismic data) can follow the steps of block 802 and the steps of block 806" (converting acceleration signals to second seismic data) can follow the steps of block 804. In some embodiments, the converting step 806 can convert the seismic signal and/or the acceleration signal to seismic data using any suitable technique or combination of techniques and any suitable information. In some embodiments, the process 800 can covert a first type of seismic signal, e.g., ground accelerations signals, into a second type of seismic signal or seismic data, e.g., ground velocity signals or ground velocity data, using known relationships between acceleration and velocity.

In some embodiments, the process 800 can convert a seismic signal (or a plurality of seismic signals) received, e.g., from the seismometer 602, over a predetermined period of time to an average seismic signal. For example, the process 800 can receive (e.g., in block 802) a seismic signal or signals relating to seismic wave frequency over a thirty second period, a one minute period or any other suitable amount of time and convert (e.g., in block 806) the seismic signals or signals over that period to an average seismic wave frequency value. Similar steps can be used to determine an average value for seismic signals corresponding to other effects of seismic waves including, but not limited to, a magnitude or intensity of a seismic event. In other embodiments, the process 800 can convert an acceleration signal (or a plurality of acceleration signals) received, e.g., from the accelerometer 604, over a predetermined period of time to an average acceleration signal. For another example, the process 800 can receive (e.g., in block 804) an acceleration signal or signals over a thirty second period, a one minute period or any other suitable amount of time and convert (e.g., in block 806) the acceleration signals or signals over that period to an average acceleration value. Similar steps can be used to determine an average value for other quantities that can be derived from acceleration signals including, but not limited to, average velocity values. Thus, in some embodiments, the blocks 802 or 804 can further include steps of storing multiple seismic or acceleration signals received at intervals over a predetermined period of time.

In some embodiments, the steps of block 806 can include steps of converting seismic signals over a first predetermined period of time to a maximum seismic value during a second, shorter, predetermined time period that is within the first predetermined period of time (referred to sometimes herein as a "peak" seismic value). For example, if the received seismic signals in block 802 are signals proportional to seismic intensity, the block 806 can include determining the seismic intensity over a ten-minute base period, and calculating a moving average of the seismic intensity over each three-second period, and finding a maximum three-second average seismic intensity by applying a predetermined multiplier to the maximum three-second moving average seismic intensity. In other embodiments, any values for the first predetermined time period (i.e., "the base period") and the second predetermined time period (i.e., "the moving average period") can be used.

Similarly, in other embodiments, the steps of block 806 can include steps of converting acceleration signals over a first predetermined period of time to a maximum acceleration value during a second, shorter, predetermined time period that is within the first predetermined period of time (referred to sometimes herein as a "peak" acceleration value). For example, if the received acceleration signals in block 804 are signals proportional to ground acceleration, the block 806 can include determining the ground acceleration over a ten-minute base period, and calculating a moving average of the ground acceleration over each three-second period, and finding a maximum three-second average ground acceleration by applying a predetermined multiplier to the maximum three-second moving average ground acceleration. In other embodiments, any values for the first predetermined time period (i.e., "the base period") and the second predetermined time period (i.e., "the moving average period") can be used.

In some embodiments, the process 800 can include a block 808 having steps of determining whether the value corresponding to the received seismic data (i.e., the "measured value") is higher than a predetermined threshold value. In some embodiments, the received seismic data may be direct measured values, e.g., seismic intensity values or ground acceleration values. In other embodiments, the received seismic data may be calculated seismic values derived from the direct measured values, e.g., ground acceleration values, and/or peak or average values of any such received data. In some embodiments, the block 808 follows block 806. For example, if the steps in block 806 convert the seismic signals to a peak measured seismic intensity value, the steps in block 808 can determine whether the peak measured seismic intensity value exceeds a predetermined threshold peak seismic intensity value. As another example, if the steps in block 806 convert the seismic signals to a measured average seismic intensity value, the steps in block 808 can determine whether the measured average seismic intensity value exceeds a predetermined threshold average seismic intensity value.

Similarly, in some other embodiments, the process 800 can include a block 808 having steps of determining whether the value corresponding to the received acceleration data (i.e., the "measured value") is higher than a predetermined threshold value. In some embodiments, the block 808 follows block 806. For example, if the steps in block 806 convert the acceleration signals to a peak measured acceleration value, the steps in block 808 can determine whether the peak measured acceleration value exceeds a predetermined threshold peak acceleration value. As another example, if the steps in block 806 convert the acceleration signals to a measured average acceleration value, the steps in block 808 can determine whether the measured average acceleration value exceeds a predetermined threshold average acceleration value.

Further, in yet other embodiments, the process 800 can include a block 808 having steps of determining whether the value corresponding to the received velocity data (i.e., the "measured value") is higher than a predetermined threshold value. In some embodiments, the block 808 follows block 806. For example, if the steps in block 806 convert the velocity signals (or the original acceleration signals) to a peak measured velocity value, the steps in block 808 can determine whether the peak measured velocity value exceeds a predetermined threshold peak velocity value. As another example, if the steps in block 806 convert the velocity signals (or the original acceleration signals) to a measured average velocity value, the steps in block 808 can determine whether the measured average velocity value exceeds a predetermined threshold average velocity value.

In some embodiments of the process 800, in the event that the seismic value (e.g., the measured seismic value, measured average seismic value or measured peak seismic value) or acceleration value (e.g., the measured acceleration value, measured average acceleration value or measured peak acceleration value) or velocity value (e.g., the measured velocity value, measured average velocity value or peak measured velocity value) exceeds a predetermined threshold value, the steps in block 808 can proceed (as denoted by arrow 810 in FIG. 8) to block 812 including steps of sending an alert to be sent to a user device 704. In some embodiments, steps of block 812 can cause an alert to be sent to a user device 704 using any technique or combination of techniques. For example, if the user device 704 is a mobile phone, the steps of block 812 can cause a text message to be sent to the user device. As another example, if the user device 704 is a personal computer, the steps of block 812 can send an alert via e-mail. As yet another example, the steps of block 812 can cause an alert to be posted to a Web site.

In some embodiments, the steps of block 812 can send an alert to a user device 704 using any suitable communication network. For example, the steps of block 812 can send an alert using the communication network 210 shown in FIGS. 6 and 7 and described in connection with the hardware 600 and 700.

In some embodiments, the process 800 includes a block 816 having steps of storing seismic data (including acceleration data and/or velocity data, if applicable) in local memory. In some embodiments, the steps of block 816 can either follow the steps of block 808 directly (as denoted by arrow 814 in FIG. 8) or via the steps of block 812 (as denoted by arrows 810 and 818 in FIG. 8). In some embodiments, any suitable local memory can be used. For example, the steps of block 816 can store seismic data in the local memory 608 as shown in FIG. 6 and described in connection with seismic station system 600.

In some embodiments, the steps of block 816 can store seismic data in local memory (e.g., memory 608) in any suitable format. For example, the steps of block 816 can store the wind speed data in an XML format, JSON format, CSV format, and/or any other suitable data format.

In some embodiments, the steps of block 816 can store various quantities of seismic data in local memory. For example, in some embodiments the steps of block 816 can store days, months, or years of seismic data in local memory. In some embodiments, if the amount of stored seismic data reaches the capacity of a local memory (e.g., memory 608), a processor (e.g., processor 606) can continue to store new seismic data by overwriting the oldest previously stored seismic data. In other embodiments, if the amount of seismic data stored in the local memory reaches a predetermined fraction of the total capacity of the local memory, a processor can send a message to a user device 704 or other device over the communication network 210.

In some embodiments, the process 800 includes a block 820 having steps of sending seismic data to a data server. In some embodiments, the steps of block 820 follow the steps of block 816. In some embodiments, the steps of block 820 can send seismic data to a data server using any suitable communication network. For example, the steps of block 820 can send seismic data to a data server 702 using the communication network 210 shown in FIGS. 6 and 7 and described in connection with the hardware 600 and 700.

Figure 9:
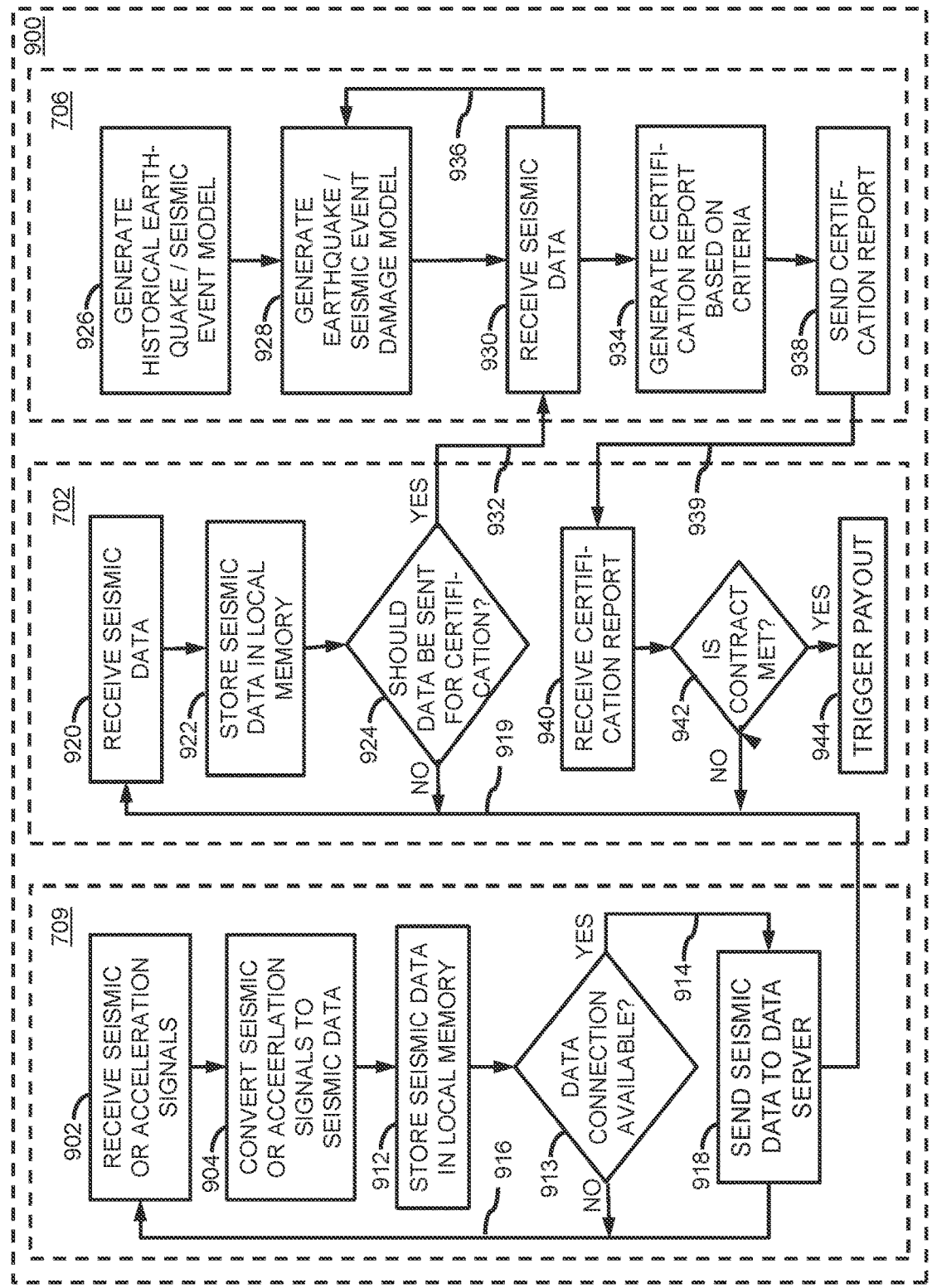
FIG. 9 shows an example of a process for managing seismic data including triggering seismic event payouts based on seismic data in accordance with some embodiments of the disclosed subject matter.

Referring now to FIG. 9, there is illustrated an example of a process 900 for triggering seismic event payouts based on seismic data in accordance with some embodiments of the disclosed subject matter. In FIG. 9, the example process 900 is illustrated by means of a block diagram wherein each block represents a step or steps of the process. In some embodiments, additional blocks can be present in between and/or in series with and/or in parallel with the blocks illustrated and/or additional steps can be present between and/or in series with and/or in parallel with the steps described.

In some embodiments, the triggering process 900 can be executed by any device or combination of devices. For example, the process 900 can be executed at least in part by one or more data servers (e.g. the data server 702 of FIG. 7), one or more user devices (e.g., the user device 704 of FIG. 7), one or more seismic stations (e.g., the seismic station 709 of FIG. 7 and/or seismic station system 600 of FIG. 6), one or more certification servers (e.g., the certification server 706 of FIG. 7), and/or any other suitable device.

In some embodiments, the trigging process 900 can begin at a block 902 having steps of receiving a seismic signal or an acceleration signal indicative of a seismic event at a seismic station 709. In some embodiments, the steps of block 902 can receive the seismic signal or the acceleration signal using any suitable techniques or combination of techniques. For example, the steps of block 902 can receive the seismic signal or the acceleration signal as described above for block 802 and/or block 804, with reference to FIG. 8.

In some embodiments, the triggering process 900 includes a block 904 having steps of converting an seismic signal and/or an acceleration signal into seismic data. In some embodiments, the steps of block 904 follow the steps of block 902. In some embodiments, the steps of block 904 can convert a seismic signal into seismic data using any suitable techniques or combination of techniques and any suitable information. For example, the steps of block 904 can convert a seismometer or accelerometer signal into seismic data as described above for block 806 with reference to FIG. 8.

In some embodiments, the triggering process 900 includes a block 912 having steps of storing seismic data in a local memory of a seismic station 709. In some embodiments, the steps of block 912 follow the steps of block 904. In some embodiments, the steps of block 912 can store seismic data in a local memory of a seismic station 709 using any suitable techniques or combination of techniques. For example, the steps of block 912 can store seismic data in the local memory of a seismic station 709 as described above for block 816 with reference to FIG. 8, or in the local memory 608 of a seismic station system 600 as described above with reference to FIG. 6.

In some embodiments, the triggering process 900 includes a block 913 having steps of determining whether a data connection is available. In some embodiments, the steps of block 913 can follow the steps of block 912. The steps of block 913 can determine whether a data connection is available using any suitable techniques or combination of techniques and any suitable information. For example, the steps of block 913 can determine whether a data connection is available by pinging a server, sending a test data packet, querying a server and/or any other suitable technique or combination of techniques.

If the steps of block 913 determine that a data connection is available, the process 900 can continue to block 918 (as denoted by arrow 914 in FIG. 9) having steps of sending seismic data to a server (e.g., 702 or 706). In some embodiments, the steps of block 918 can send seismic data to a server (e.g., 702 or 706) using any suitable techniques or combination of techniques. For example, the steps of block 918 can send seismic data to a server (e.g., the data server 702 and/or certification server 706 of FIG. 7) as described above for block 820 with reference to FIG. 8. If the steps of block 913 determine that a data connection is not available, the process 900 can continue by repeating an earlier part of the process (e.g., as denoted by arrow 916 in FIG. 9).

In some embodiments, the triggering process 900 includes a block 920 having steps of receiving seismic data at a data server (e.g., the data server 702 of FIG. 7). In some embodiments, the steps of block 920 follow the steps of block 918 (as denoted by arrow 919 in FIG. 9). In some embodiments, the steps of block 920 can receive seismic data using any suitable techniques or combination of techniques. For example, the steps of block 920 can receive the seismic data via a communication network (e.g., the communication network 210 of FIGS. 6 and 7).

In some embodiments, the triggering process 900 includes a block 922 having steps of storing seismic data. In some embodiments, the steps of block 922 follow the steps of block 920. In some embodiments, the steps of block 922 can store seismic data using any suitable techniques or combination of techniques. For example, the steps of block 922 can store seismic data on a memory and/or storage (e.g., the memory and/or storage 304 of FIG. 3).

In some embodiments, the triggering process 900 includes a block 924 having steps of determining whether seismic data should be sent for certification. In some embodiments, the steps of block 924 can follow the steps of block 922. In some embodiments, the steps of block 924 can determine whether seismic data should be sent for certification using any suitable techniques or combination of techniques and any suitable information. For example, the steps of block 924 can determine whether seismic data should be sent for certification based on whether the seismic data is related to a well-known seismic event (e.g., a nationally publicized seismic event). As a more particular example, if the seismic data is gathered from a location and time period associated with an earthquake or seismic event reported by a national seismic or geological organization (e.g., the United Stated Geological Survey "USGS") or national emergency organization (e.g., the Federal Emergency Management Agency "FEMA"), the steps of block 924 can determine that the seismic data should be sent for certification. As another example, the steps of block 924 can determine whether seismic data should be sent for certification based on a threshold seismic value. As a more particular example, if the seismic data includes a seismic intensity value that is higher than a predetermined threshold seismic intensity value, the steps of block 924 can determine that the seismic data should be sent for certification. Similarly, if the seismic data includes a ground acceleration value that is higher than a predetermined threshold ground acceleration value, the steps of block 924 can determine that the seismic data should be sent for certification. Similarly, if the seismic data includes a ground velocity value that is higher than a predetermined threshold ground velocity value, the steps of block 924 can determine that the seismic data should be sent for certification. If the steps of block 924 determine that the seismic data does not need to be certified, the process 900 can continue by repeating an earlier part of the process (e.g., as denoted by arrow 919 in FIG. 9).

In some embodiments, the triggering process 900 includes a block 926 having steps of generating a historical earthquake or seismic event model. In some embodiments, the steps of block 926 can generate a historical earthquake or seismic event model using any suitable technique or combination of techniques and any suitable information.

In some embodiments, the steps of block 926 can generate a historical earthquake or seismic event model using any suitable earthquake or seismic event data. For example, the steps of block 926 can use data cataloging seismic characteristics of well-known historical earthquakes including, but not limited to, the 1906 San Francisco earthquake, the 1923 Great Kanto earthquake (Japan), the 1964 Alaska earthquake, the 1980 Campania (Italy) earthquake, the 1994 Northridge (California) earthquake and the 2017 Mexico City earthquake. In another example, the steps of block 926 can catalog the frequency and severity (e.g., overall magnitude, local intensity, local acceleration, etc.) of earthquakes along the San Andreas Fault of southern California over a certain period. As a more particular example, the steps of block 926 can use an earthquake or seismic event dataset that records the time, date, epicenter location, magnitude, duration, maximum intensity and maximum acceleration for earthquakes from a given set of years, e.g., the years 1900 through 2000. In other embodiments, the steps of block 926 can use a earthquake or seismic event dataset for earthquake or seismic event from the year 1900 through the most recent year for which earthquake or seismic event data is available. In still other embodiments, the steps of block 926 can use a earthquake or seismic event dataset for earthquake or seismic event from a predetermined first year agreed-to under a contract through a predetermined final year agreed-to under the contract.

In some embodiments, the steps of block 926 can further include supplementing historical earthquake or seismic event data by generating synthetic earthquakes or seismic events and/or generating a historical earthquake or seismic event model based at least in part on the synthetic earthquakes or seismic events.

In some embodiments, the triggering process 900 includes a block 928 having steps of generating an earthquake or seismic event damage model based on a historical earthquake or seismic event model. In some embodiments, the steps of block 928 can follow the steps of block 926, and the historical earthquake or seismic event model can be the historical earthquake or seismic event model generated by the steps of block 926. In some embodiments, the steps of block 928 can generate an earthquake or seismic event damage model based on the historical earthquake or seismic event model using any suitable techniques or combination of techniques and any suitable information.

In some embodiments, the steps of block 928 can generate an earthquake or seismic event damage model by simulating seismic intensity and/or ground accelerations and/or ground velocity based on the historical earthquake or seismic event model. For example, the steps of block 928 can simulate peak seismic intensity, peak ground acceleration, peak ground velocity or other peak seismic characteristic in the historical earthquake or seismic event model and associate the simulated peak seismic intensity or peak ground acceleration or other peak seismic characteristic with historical damage information.

In some embodiments, the triggering process 900 includes a block 930 having steps of receiving seismic data if the process determines (e.g., from the steps of block 924) that that seismic data should be sent for certification (i.e., as denoted by arrow 932 in FIG. 9). In some embodiments, the steps of block 930 can receive seismic data using any suitable technique or combination of techniques. For example, the steps of block 930 can receive seismic data via a communication network (e.g., the communication network 210 of FIGS. 6 and 7) from a seismic station 709 or seismic station system 600 as described above. As another example, the steps of block 930 can receive seismic data via a communication network (e.g., the communication network 210 of FIGS. 6 and 7) from a data server, e.g., the data server 702 of FIG. 7. The seismic data received can be seismic data from a seismic station at the geographic location of interest and can also include seismic data from other geographic locations such as remote seismic stations.

In some embodiments, the triggering process 900 includes a block 934 having steps of generating a certification report for the received seismic data from the geographic location of interest based on the historical earthquake or seismic event model, and/or the earthquake or seismic event damage model. In some embodiments, the steps of block 934 can follow the steps of block 930. In some embodiments, the steps of block 934 can generate a certification report for the received seismic data from the geographic location of interest based on the historical earthquake or seismic event model (e.g., from block 926) and/or the earthquake or seismic event damage model (e.g., from block 928) using any suitable technique or combination of techniques and any additional suitable information. For example, in some embodiments, the process 900 and the steps of block 934 can generate a certification report by inputting (as denoted by arrow 936 in FIG. 9) the received seismic data in addition to information related to buildings in an area related to the seismic data (e.g., construction class of the buildings, building height, building occupancy, year of construction, and/or floor area) into the earthquake or seismic event damage model. As a more particular example, if the seismic characteristics (e.g., seismic intensity or acceleration or velocity) from the seismic data are within a predetermined number of standard deviations from the seismic characteristics of an earthquake or seismic event predicted by the model, the steps of block 934 can generate a certification report that certifies the seismic data. As another example, the steps of block 934 can generate a certification report by comparing the received seismic data (e.g., from block 930) with a seismic intensity predicted by the historical earthquake or seismic event model (e.g., from block 926). As still another example, the steps of block 934 can generate a certification report for the seismic data received from the geographic location of interest (i.e., "local seismic data") by comparing the local seismic data to seismic data received from seismic stations 709 at other geographic locations for the same event (i.e., "remote seismic data"), and determining if the seismic characteristics of the local seismic data bear a predetermined relationship with the seismic characteristics of the remote seismic data. Such predetermined relationships can be set by review of historic earthquake intensity data, historic earthquake damage data, earthquake intensity models and/or earthquake damage models for the location of interest and the location of the remote seismic station. In some embodiments, first seismic data considered to be local seismic data from a first seismic station 709 to be certified in a first case can be considered, in a second case, to be remote seismic data from a remote seismic station and used to certify second seismic data from the a second seismic station. As yet another example, the steps of block 934 can generate a certification report based on earthquake or seismic event data received from a third party server 714, e.g., from USGS or FEMA.

In some embodiments, the triggering process 900 includes a block 938 having steps of sending a certification report (e.g., as denoted by arrow 939 in FIG. 9). In some embodiments, the steps of block 938 can follow the steps of block 934. In some embodiments, the steps of block 938 can send the certification report using any suitable techniques or combination of techniques. For example, the steps of block 938 can send the certification report to a data server (e.g., the data server 702 of FIG. 7) via a communication network (e.g., the communication network 210 of FIG. 7). The triggering process 900 may further include a block 940 having steps of receiving the certification report sent by the steps of block 938. In some embodiments, the steps of block 940 can receive the certification report using any suitable techniques or combination of techniques. For example, the steps of block 940 can receive the certification report from a communication network (e.g., the communication network 210 of FIG. 7) using a data server (e.g., the data server 702 of FIG. 7).

In some embodiments, the triggering process 900 includes a block 942 having steps of determining if a contract has been met. In some embodiments, the steps of block 942 can follow the steps of block 940. In some embodiments, the steps of block 942 can determine if a contract has been met using any suitable techniques or combination of techniques and/or any suitable information. For example, the steps of block 942 can determine if a contract has been met based on the received certification report, e.g., the certification report received from block 940. For example, the steps of block 942 can determine that a seismic intensity or a ground acceleration or other seismic characteristic contained in seismic data is greater than a threshold amount contained in a contract and that the certification report certifies that such seismic intensity or ground acceleration or other seismic characteristic is correct, and accordingly determine that the contract has been met. As another example, the steps of block 942 can determine that a seismic intensity or ground acceleration or other seismic characteristic contained in seismic data is greater than a threshold amount contained in a contract, and that the certification report does not certify that such a seismic intensity or ground acceleration or other seismic characteristic is correct, and accordingly determine that the contract has not been met.

In some embodiments, the steps of block 942 can determine if a contract has been met by submitting the seismic data and certification report for manual review. For example, if the steps of block 942 determine that seismic data includes a seismic intensity, ground acceleration, ground velocity or other seismic characteristic that is higher than a respective threshold seismic intensity, ground acceleration, ground velocity or other seismic characteristic contained in a contract, and that the certification report certifies that the seismic data is correct, the steps of block 942 can then submit the seismic data and the certification report for manual review.

In some embodiments, the triggering process 900 includes a block 944 having the steps of triggering a payout of a contract. In some embodiments, the steps of block 944 can follow the steps of block 942 if the steps of block 942 determined that the contract was met. In some embodiments, the steps of block 942 can trigger a payout of the contract using any suitable technique or combination of techniques. For example, the steps of block 942 can trigger a payout of the contract by sending information to a contract payout server (e.g., the contract payout server 708 of FIG. 7). As another example, the steps of block 942 can trigger a payout by processing an electronic transaction such as a bank deposit, an electronic funds transfer, a direct deposit, sending a digital currency and/or any other suitable electronic transaction.

In some embodiments, at least some of the above-described blocks and/or steps of the processes of FIGS. 8 and 9 can be executed or performed in any order or sequence not limited to the order and sequence shown in and described in connection with the figures. Also, some of the above blocks and/or steps of FIGS. 8 and 9 can be executed or performed substantially simultaneously where appropriate or in parallel to reduce latency and processing times. Additionally or alternatively, some of the above described blocks and/or steps of the processes of FIGS. 8 and 9 can be omitted.

Figure 10:
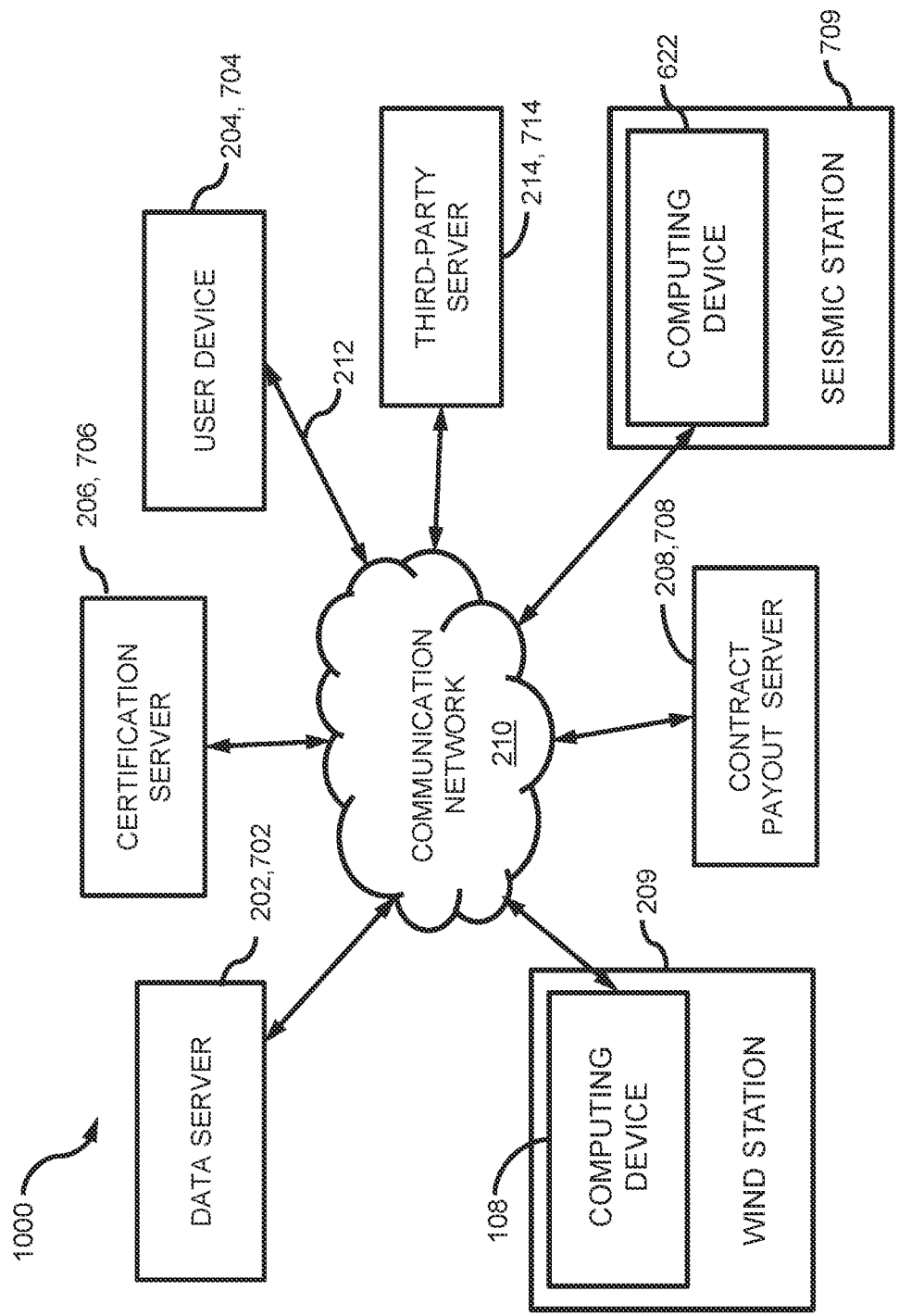
FIG. 10 shows an example of hardware for managing both wind speed data and seismic data that can be used in accordance with some embodiments of the disclosed subject matter.

Referring now to FIG. 10, there is illustrated a system 1000 for managing both wind speed data and seismic data that can be used in accordance with some embodiments of the disclosed subject matter. In one embodiment of system 1000, wind speed signals from anemometers 104 at wind station systems 100 and/or wind stations 209 are converted into wind speed data and seismic and/or acceleration signals from seismometers 602 and/or accelerometers 604 are converted into seismic signals at seismic station systems 600 and/or seismic stations 709. In this embodiment of the system 1000, the respective wind speed data and seismic data can be transmitted through a common communication network 210 to data servers 202, 702, certification servers 206, 706 and contract payout servers 208, 708, wherein the data servers 202 and 702 can be implemented with the same or separate apparatus, the certification servers 206 and 706 can be implemented with the same or separate apparatus and/or the contract payout servers 208 and 708 can be implemented with the same or separate apparatus.

Using the system 1000, a process is provided for triggering multi-factor event payouts based on either wind speed data or seismic data or both types of data in accordance with further embodiments of the disclosed subject matter. Analogous in most respects to the process 500 of FIG. 5 and the process 900 of FIG. 9, the multi-factor event triggering process can receive multi-factor data including wind speed data, e.g., from wind stations 209, and seismic data, e.g., from seismic stations 709. In some embodiments of the multi-factor triggering process, the multi-factor data can be received and stored at a data server 202, 702 according to processes substantially identical to those described for blocks 520, 522, 920 and 922. In some embodiments of the multi-factor triggering process, the data server 202, 702 can determine if the multi-factor data should be sent for certification according to processes substantially identical to those described for blocks 524 and 924. When sent for certification, the multi-factor data can be received by a certification server 206, 706. In some embodiments of the multi-factor triggering process, the certification server 206, 706 can generate historical storm models, wind speed damage models, historical earthquake or seismic event models and earthquake or seismic event damage models according to processes substantially similar to those described for blocks 526, 528, 926 and 928.

In some embodiments, the multi-factor triggering process can further have steps of receiving multi-factor data if the process determines (e.g., from the steps of block 524, 924) that that multi-factor data should be sent for certification (i.e., as denoted by arrows 532 and 932 in FIGS. 5 and 9). The steps of receiving the multi-factor data can be substantially similar to the processes described for blocks 530 and 930. In some embodiments of the multi-factor triggering process, a certification report can be generated for the received multi-factor data according to processes substantially similar to those described for blocks 534 and 934. In some embodiments of the multi-factor triggering process, a certification report can be sent (e.g., to a data server 202 or 702) via a communication network according to processes substantially similar to those described for blocks 538 and 938. In some embodiments, the multi-factor triggering process can receive the certification report using any suitable techniques or combination of techniques. For example, the certification report can be received from a communication network (e.g., the communication network 210) using a data server (e.g., the data server 202 or 702).

In some embodiments, the multi-factor triggering process includes steps of determining if a contract has been met according to processes substantially similar to those described for blocks 542 and 942. In some embodiments, the multi-factor triggering process can determine if a contract has been met using any suitable techniques or combination of techniques and/or any suitable information. For example, the steps can determine if a contract has been met based on the received certification report covering wind speed data and/or seismic data. For example, the steps of the multi-factor process can determine that a measured wind speed value contained in wind speed data is greater than a threshold value contained in a contract and that the certification report certifies that such measured wind speed value is correct, and/or that a measured seismic intensity value, a measured ground acceleration value or a measured ground velocity value contained in seismic data is greater than a respective threshold value contained in a contract and that the certification report certifies that such respective measured seismic intensity value, measured ground acceleration value, or measured ground velocity value is correct, and thereupon determine that the contract has been met. In some embodiments, a certification report can certify that a respective measured wind or seismic value is "correct" if the respective measured value falls within predetermined parameters compared to one or more certification control values specified in the contract. In some embodiments, the respective certification control values can be respective wind or seismic values predicted by a respective wind or seismic historical model or wind or seismic damage model. In some other embodiments, the respective certification control values can be respective wind or seismic values received from one or more predetermined remote wind or remote seismic stations. In one example, the predetermined parameters can be a predetermined number of standard deviations, i.e., the measured values are considered "correct" if they are within a predetermined number of standard deviations from the control values, e.g., from the values predicted by the historical model or damage model or received from the remote station. In another example, the predetermined parameters can be a predetermined percentage difference, i.e., the measured values are considered "correct" if they are within a predetermined percentage difference from the control values, e.g., from the values predicted by the historical model or damage model or received from the remote station. However, even if a measured wind speed, seismic intensity, ground acceleration or ground velocity contained, respectively, in a wind speed data or seismic data is greater than a threshold amount contained in a contract, the steps of the multi-factor triggering process can determine that a contract is not met if the certification report does not certify that such a measured wind speed, seismic intensity, ground acceleration or ground velocity is correct.

In some embodiments, the steps of the multi-factor triggering process can determine if a contract has been met by submitting the wind data and seismic data and certification report for manual review. For example, if the earlier steps determine that wind data includes a wind speed that is higher than a threshold wind speed contained in a contract, or the earlier steps determine that seismic data includes a seismic intensity or ground acceleration that is higher than a threshold seismic intensity or ground acceleration contained in the contract, and that the certification report certifies that the relevant wind data and/or seismic data is correct, the steps of the triggering process can then submit the wind speed data and the seismic data and the certification report for manual review.

In some embodiments, the multi-factor triggering process includes the steps of triggering a payout of a contract according to processes substantially similar to those described for blocks 544 and 944. In some embodiments, the steps of triggering a payout of a contract can follow the steps of determining that the contract was met. In some embodiments, the steps can trigger a payout of the contract using any suitable technique or combination of techniques. For example, the steps of the multi-factor triggering process can trigger a payout of the contract by sending information to a contract payout server (e.g., the contract payout server 208 or 708). As another example, the steps of the multi-factor triggering process can trigger a payout by processing an electronic transaction such as a bank deposit, an electronic funds transfer, a direct deposit, sending a digital currency and/or any other suitable electronic transaction. In some embodiments, if two separate contract criteria are satisfied by certified data, the multifactor triggering process can trigger two separate payouts, i.e., one payout for each criterion satisfied. In other embodiments, if two separate contract criteria are satisfied by certified data, the multifactor triggering process can trigger only the higher one of the two separate payouts (e.g., if the payout amounts for the two criteria are different), or only a single payout (e.g., if the payout amounts for the two criteria are identical).

In still another aspect, secure measurement stations can be provided at particular geographic locations to measure other natural and/or manmade phenomena events including, but not limited to, tsunami or tidal waves, volcanic ash or gas emissions, droughts, air pollution (also known as "smog") levels or levels of specific pollutants at the particular geographic locations, wherein the various phenomena event measurements are received and converted into phenomena event data and stored in memory in the secure measurement stations using apparatus and processes analogous to those described herein for wind speed and seismic data. Further, the phenomena event data from the secure measurement stations can be transmitted to a phenomena event data system including data servers, certification servers and/or payout servers using apparatus and processes analogous to those described herein for wind speed and seismic data. The phenomena event data system can provide apparatus and processes for receiving the phenomena event data analogous to those described herein for wind speed and seismic data and determining if the event data needs to be certified. The phenomena data system can provide apparatus and processes for generating historical models of various phenomena events and/or for generating damage models of various phenomena events analogous to those described herein for wind speed and seismic data. The phenomena data system can provide apparatus and processes for triggering payouts triggering payouts analogous to those described herein for wind speed and seismic data. The phenomena data system can provide apparatus and processes for triggering payouts based on the phenomena data from the secure measurement stations, either alone or combined with wind speed data and/or seismic data from wind stations and/or seismic stations, respectively.

In some embodiments, any suitable computer readable media can be used for storing instructions for performing the functions and/or processes herein. For example, in some embodiments, computer readable media can be transitory or non-transitory. For example, nontransitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A system comprising:
a certification server configured to:
receive parametric data over an external communications network from a sensor operatively connected to one of a plurality of remote parametric stations in response to the parametric data at a parametric station satisfying a predetermined condition, generate a certification report based on the parametric data and a data model related to the sensor from which the parametric data was received, and transmit the generated certification report to a payout server to trigger a payout when terms of a contract are satisfied based on the certification report.

2. The system of claim 1, further comprising:
the parametric station configured to:
receive the parametric data from the sensor;
determine that the parametric data satisfies the predetermined condition; and
transmit the parametric data over the external communications network to the certification server in response to the parametric data satisfying the predetermined condition.

3. The system of claim 1, further comprising:
the payout server configured to:
receive, using the payout server, the generated certification report from the certification server;
determine that terms of an associated contract are satisfied based on the certification report, and
trigger a payout based on the terms that are satisfied based on the certification report.

4. The system of claim 1, further comprising:
the parametric station configured to:
receive the parametric data from the sensor;
determine that the parametric data satisfies the predetermined condition; and
transmit the parametric data over the external communications network to the certification server in response to the parametric data satisfying the predetermined condition; and
the payout server configured to:
receive, using the payout server, the generated certification report from the certification server;
determine that terms of an associated contract are satisfied based on the certification report, and
trigger a payout based on the terms that are satisfied based on the certification report.

5. The system of claim 1, wherein:
the certification server is further configured to:
receive a dataset that includes historic parametric data at a location of the parametric station; and
generate a historical model using the historical parametric data from the received dataset; and
generating the certification report based on the parametric data and the data model comprises generating the certification report based on comparing the parametric data to the generated historical model.

6. The system of claim 5, further comprising:
simulating wind gusts based on the historical model;
generating a parametric damage model based on the simulated wind gusts.

7. The system of claim 6, further comprising:
comparing the parametric data received with the parametric data determined by the parametric damage model.

8. The system of claim 7, wherein generating the certification report based on the parametric data and the data model comprises:
generating the certification report based on comparing the parametric data with the parametric damage model.

9. A method comprising:
receiving, using a certification server, parametric data over an external communications network from a sensor operatively connected to one of a plurality of remote parametric stations in response to the parametric data at a parametric station satisfying a predetermined condition, generating, using the certification server, a certification report based on the parametric data and a data model related to the sensor from which the parametric data was received, and transmitting, using the certification server, the generated certification report to a payout server to trigger a payout when terms of a contract are satisfied based on the certification report.

10. The method of claim 9, further comprising:
receiving, using the parametric station, the parametric data from the sensor;
determining, using the parametric station, that the parametric data satisfies the predetermined condition; and
transmitting, using the parametric station, the parametric data over the external communications network to the certification server in response to the parametric data satisfying the predetermined condition.

11. The method of claim 9, further comprising:
receiving, using the payout server, the generated certification report from the certification server;
determining, using the payout server, that terms of an associated contract are satisfied based on the certification report, and
triggering, using the payout server, a payout based on the terms that are satisfied based on the certification report.

12. The method of claim 9, further comprising:
receiving, using the certification server, a dataset that includes historic parametric data at a location of the parametric station; and
generating, using the certification server, a historical model using the historical parametric data from the received dataset,
wherein generating the certification report based on the parametric data and the data model comprises generating the certification report based on comparing the parametric data to the generated historical model.

13. The method of claim 12, wherein the parametric data is within a standard deviation of the generated historical model.

14. The method of claim 13, further comprising:
simulating wind gusts based on the historical model;
generating a parametric damage model based on the simulated wind gusts.

15. The method of claim 14, further comprising:
comparing the parametric data received with the parametric data determined by the parametric damage model.

16. The method of claim 15, wherein generating the certification report based on the parametric data and the data model comprises:
generating the certification report based on comparing the parametric data with the parametric damage model.

17. The method of claim 16, wherein the certification report is generated when the parametric data is within a standard deviation of the parametric data determined by the parametric damage model.

18. A parametric certification system for certifying parametric content retrieved from an Internet computer network by individual remote parametric sensors, said parametric certification system comprising:
a remote parametric station configured to generate parametric data for said individual remote parametric sensors;
at least one certifying scheme;
a plurality of sets of logical certifying elements; and a remote certification server coupled to said parametric station and said Internet computer network, said certification server associating each said parametric sensor to at least one certifying scheme and at least one set of certifying elements, said certification server further receiving said parametric data from said parametric station and executing said associated certifying scheme utilizing the associated at least one set of logical certifying elements.

19. The parametric certification server of claim 18, wherein the at least one certifying scheme is a parametric damage model and the logical certifying elements include location, time, and date for generation of the parametric data.

20. The parametric certification server of claim 18, wherein the remote certification server is further configured to generate a certification report based on executing the associated certifying scheme.

* * * * *